(12) United States Patent
Ninomiya et al.

(10) Patent No.: US 11,602,240 B2
(45) Date of Patent: Mar. 14, 2023

(54) BEVERAGE DISPENSING APPARATUS AND BEVERAGE DISPENSING METHOD

(71) Applicant: FUJI ELECTRIC CO., LTD., Kawasaki (JP)

(72) Inventors: Yuki Ninomiya, Yokkaichi (JP); Koichi Ito, Yokkaichi (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 372 days.

(21) Appl. No.: 16/804,653

(22) Filed: Feb. 28, 2020

(65) Prior Publication Data

US 2020/0196793 A1    Jun. 25, 2020

Related U.S. Application Data

(63) Continuation of application No. PCT/JP2018/029199, filed on Aug. 3, 2018.

(30) Foreign Application Priority Data

Sep. 12, 2017    (JP) .............................. JP2017-175017

(51) Int. Cl.
*G07F 13/06*    (2006.01)
*A47J 31/52*    (2006.01)
(Continued)

(52) U.S. Cl.
CPC .............. *A47J 31/525* (2018.08); *B67D 7/34* (2013.01); *G07F 9/002* (2020.05); *G07F 9/10* (2013.01); *G07F 13/04* (2013.01); *G07F 13/065* (2013.01)

(58) Field of Classification Search
CPC ....... G07F 13/06; G07F 13/065; B67D 7/346; B67D 7/348
See application file for complete search history.

(56) References Cited

U.S. PATENT DOCUMENTS

| 2002/0030102 A1* | 3/2002 | Brown .................... G07F 13/06 |
| | | 235/435 |
| 2006/0238346 A1* | 10/2006 | Teller ................. G01G 23/3735 |
| | | 340/572.1 |

(Continued)

FOREIGN PATENT DOCUMENTS

| CN | 202275456 U | 6/2012 |
| CN | 104545454 A | 4/2015 |

(Continued)

OTHER PUBLICATIONS

PCT/ISA/237; Written Opinion of the International Searching Authority dated Oct. 16, 2018 in International (PCT) Application No. PCT/JP2018/029199.

(Continued)

*Primary Examiner* — Timothy R Waggoner
(74) *Attorney, Agent, or Firm* — Rabin & Berdo, P.C.

(57) ABSTRACT

A beverage dispensing apparatus for preparing a beverage and dispensing the prepared beverage into a container. The beverage dispensing apparatus includes a beverage reading device configured to read information indicating the beverage, the information including a kind and a volume of the beverage, a display operation device configured to display thereon the information indicating the beverage, and a control device configured to perform control to cause the display operation device to display the information indicating the beverage, and to cause the beverage to be prepared and dispensed into the container.

13 Claims, 19 Drawing Sheets

(51) Int. Cl.
*G07F 9/10* (2006.01)
*G07F 13/04* (2006.01)
*G07F 9/00* (2006.01)
*B67D 7/34* (2010.01)

(56) References Cited

U.S. PATENT DOCUMENTS

| | | | |
|---|---|---|---|
| 2007/0215239 A1* | 9/2007 | Dorney | G06Q 20/342 222/146.2 |
| 2011/0264285 A1* | 10/2011 | Mattos, Jr. | B67D 1/0041 700/283 |
| 2013/0240084 A1* | 9/2013 | Carter | B67D 7/346 141/94 |
| 2015/0170533 A1 | 6/2015 | Hayashi et al. | |
| 2017/0135519 A1 | 5/2017 | Deng et al. | |
| 2017/0186110 A1* | 6/2017 | Carpenter | G06Q 50/12 |
| 2018/0290874 A1* | 10/2018 | Roberts | G07F 9/001 |
| 2020/0093318 A1* | 3/2020 | Arai | B67D 1/08 |

FOREIGN PATENT DOCUMENTS

| | | |
|---|---|---|
| CN | 105228943 A | 1/2016 |
| CN | 107016784 A | 8/2017 |
| JP | H09-267845 A | 10/1997 |
| JP | 2006-264733 A | 10/2006 |
| JP | 2009-151441 A | 7/2009 |
| JP | 2015-029544 A | 2/2015 |
| JP | 2017-007715 A | 1/2017 |
| JP | 2017-091312 A | 5/2017 |
| JP | 2017-110178 A | 6/2017 |
| JP | 2017-159941 A | 9/2017 |
| WO | 2014/034826 A1 | 3/2014 |

OTHER PUBLICATIONS

PCT/ISA/210; International Search Report dated Oct. 16, 2018 in International (PCT) Application No. PCT/JP2018/029199.

* cited by examiner

BEVERAGE DISPENSING APPARATUS AND BEVERAGE DISPENSING METHOD

CROSS-REFERENCE TO RELATED APPLICATION(S)

The present application claims priority to and incorporates by reference the entire contents of PCT International Application No. PCT/JP2018/029199 filed on Aug. 3, 2018.

BACKGROUND

The present disclosure relates to a beverage dispensing apparatus and a beverage dispensing method.

Recently, it is often the case that a store such as a convenience store has a beverage dispensing apparatus such as a coffee machine installed therein. A coffee machine, for example, prepares a beverage through preparatory processes such as coffee bean grinding and a dripping extraction process, and then dispenses the prepared beverage.

For example, Japanese Laid-open Patent Publication No. 2017-007715 discloses an apparatus that is operated in the following manner: an information code is prepared in accordance with an order placed by a user; the user receives a cup having the information code attached thereon by a store clerk; a code reading unit automatically reads the information code attached to the beverage container when the cup is set on a tray in the beverage discharging apparatus; a beverage menu that can be sold is displayed on a touch panel in accordance with the result of the reading; and the user selects a desired beverage from the displayed beverage menu.

SUMMARY

There is a need for providing a beverage dispensing apparatus and a beverage dispensing method that are capable of preventing a human error in selection, such as pressing a wrong button, in using of a beverage dispensing apparatus and are also capable of preventing dispensing of beverages that would be wasted.

According to an embodiment, a beverage dispensing apparatus to prepare a beverage and dispense the prepared beverage into a container, includes: a beverage reading unit reading information indicating a beverage, the beverage having been purchased from among a plurality of beverages that can be supplied and based on information of the beverages, the information including respective kinds and volumes of the beverages; a display unit displaying the information indicating the beverage for confirmation; and a control unit performing control to cause the display unit to display the information indicating the beverage, and then prepare and dispense the beverage into a container.

According to an embodiment, a beverage dispensing method for preparing a purchased beverage and dispensing the prepared beverage into a container, includes: a step of reading information indicating a beverage, the beverage having been purchased from among a plurality of beverages that can be supplied and based on information of the beverages, the information including respective kinds and volumes of the beverages; a step of displaying the information indicating the beverage for confirmation; and a step of preforming control to display the information indicating the beverage for confirmation and then prepare and dispense the beverage into a container.

DETAILED DESCRIPTION

In the related art, the apparatus disclosed in Japanese Laid-open Patent Publication No. 2017-007715 needs a user to select a desired beverage from the beverage menu displayed on the touch panel and leaves the user a possibility of pressing a wrong button.

Otherwise, when a user is purchasing a beverage using a typical beverage dispensing apparatus, miscommunication between the user and a store clerk may result in purchase of a beverage that is not an ordered one. In that case, a beverage that is not an ordered one is prepared and dispensed for the user.

That is, when the user presses a wrong button or when an ordered beverage is mistaken, a beverage that would be wasted is dispensed.

Embodiments for carrying out this disclosure are described below in detail with reference to the drawings.

First Embodiment

Figure 1:
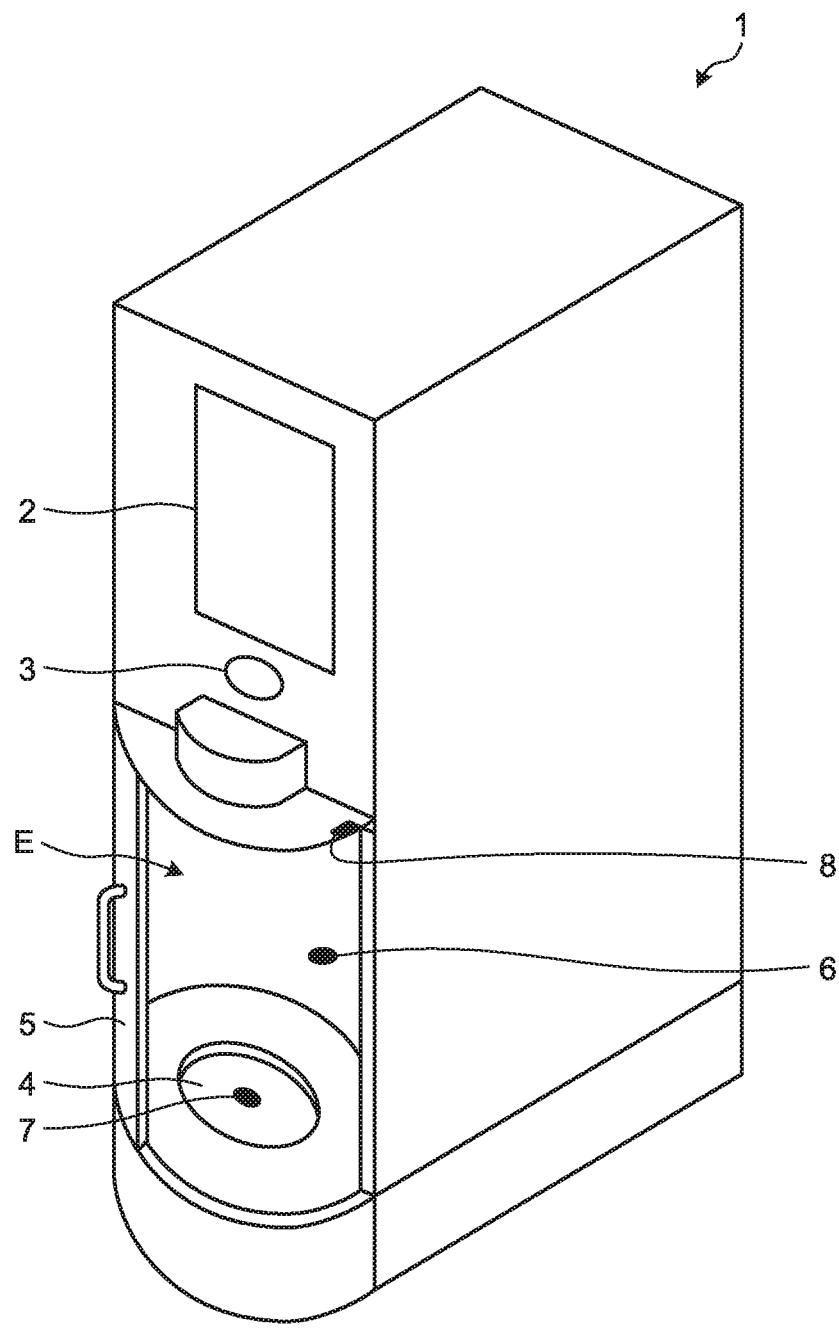
FIG. 1 is a perspective view illustrating the exterior configuration of a beverage dispensing apparatus according to a first embodiment of the present disclosure.
Figure 2:
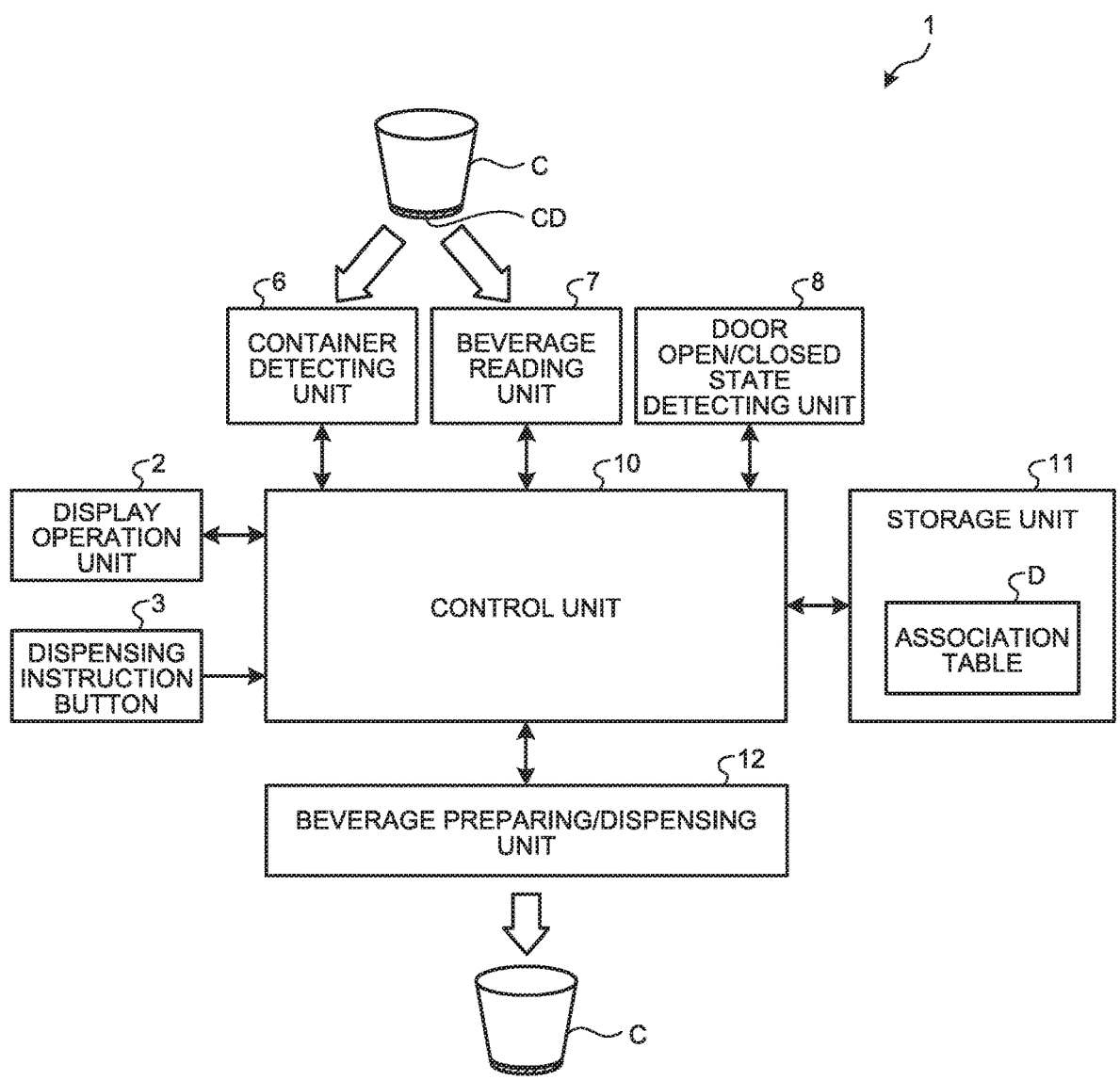
FIG. 2 is a block diagram illustrating a control system in the beverage dispensing apparatus illustrated in FIG. 1.

FIG. 1 is a perspective view illustrating the exterior configuration of a beverage dispensing apparatus 1 according to a first embodiment of the present disclosure. FIG. 2 is a block diagram illustrating a control system of the beverage dispensing apparatus 1 illustrated in FIG. 1. This beverage dispensing apparatus 1 is, for example, a coffee machine installed in a store such as a convenience store. A coffee machine, for example, performs coffee bean grinding and a dripping extraction process and then dispenses coffee.

As illustrated in FIG. 1, the beverage dispensing apparatus 1 has a display operation unit 2 provided on the upper part of the front face. The display operation unit 2 can display confirmation (information) seeking on specifics of a beverage to be dispensed, guides for beverage dispensing and the like and can receive input of desired operations. The display operation unit 2 is implemented in the form of, for example, a liquid crystal touch panel. A dispensing instruction button 3 for placing an instruction for beverage dispensing is provided below the display operation unit 2. The dispensing instruction button 3 may be a graphic user interface (GUI) button on the display operation unit 2.

In the lower part of the front face of the beverage dispensing apparatus 1, a dispensing area E in which a container is to be placed and a beverage is dispensed into the container is formed. In the lower part in the dispensing area E, a platform 4 on which container is placed is formed. In the front face of the dispensing area E, an opening/closing door 5 that is openable and closable is provided. A container detecting unit 6 that detects a container placed on the platform 4 is provided in the innermost part of the dispensing area E. Being disposed at a relatively low position such that containers for all beverage kinds can be detected, the container detecting unit 6 detects a container based on, for example, differences in reflection acquired from an optical sensor. At the center of the platform 4, a beverage reading unit 7 that reads a beverage formed on the bottom part of a container placed on the platform 4 is provided. A door open/closed state detecting unit 8 that detects a closed state of the opening/closing door 5 is provided on the upper side of the front right part of the dispensing area E.

As illustrated in FIG. 2, the display operation unit 2, the dispensing instruction button 3, the container detecting unit 6, the beverage reading unit 7, and the door open/closed state detecting unit 8 described above are connected to a control unit 10. The control unit 10 is further connected to a storage unit 11 and a beverage preparing/dispensing unit 12. The storage unit 11 has at least an association table D therein that has the association between beverages to be read by the beverage reading unit 7 and specifics of the respective beverages. The beverage preparing/dispensing unit 12 prepares and dispenses a beverage as instructed by the control unit 10.

As illustrated in FIG. 2, according to the first embodiment, a beverage Cup Data (CD) is formed on the bottom part of each container C that has been purchased. This beverage CD is what is used for specifying a beverage, including the kind and the volume of a corresponding beverage. It is preferable that each beverage CD can specify one particular beverage that has been purchased. The respective beverages CD are, for example, colors different by beverage and applied to the bottom parts of the containers C. The respective colors have different levels of reflectance. A user who purchases a beverage may bring one of the containers C having the beverages CD on the bottom parts thereof to a checkout counter in a store or may receive that container C from a store clerk at the checkout counter in the store.

When such containers C are used, the beverage reading unit 7 detects different levels of reflectance, which means that an optical sensor, for example, is usable therefor. In order to specify various kinds of beverage, various colors and a plurality of sensors may be used.

Figure 3:
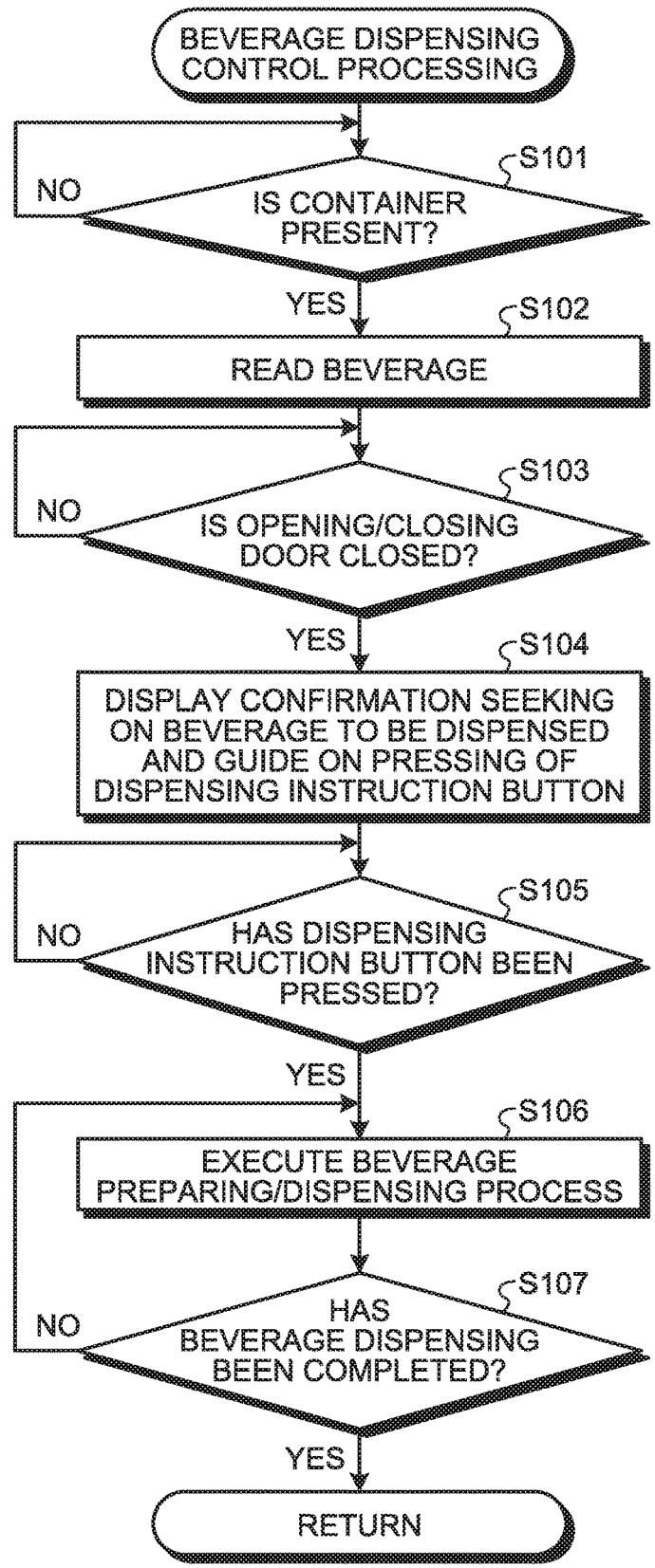
FIG. 3 is a flowchart illustrating the procedure of beverage dispensing control processing in a control unit of the beverage dispensing apparatus illustrated in FIG. 1.

The procedure of beverage dispensing control processing to be executed by the control unit 10 is described here with reference to a flowchart illustrated in FIG. 3. As illustrated in FIG. 3, at the start, the control unit 10 determines whether the container detecting unit 6 has detected the presence of the container C (step S101). That is, the container detecting unit 6 detects whether the container C is placed on the platform 4. If the presence of the container C is detected (Yes at step S101), the beverage reading unit 7 reads (information of) the beverage CD on the bottom part of the placed container C, and the control unit 10 specifies, by referring to the association table D, a beverage that corresponds to the result of the reading of the beverage CD (step S102). In contrast, if the presence of the container C is not detected (No at step S101), the control unit 10 repeats the determination processing at step S101.

After the beverage reading unit 7 reads the beverage CD (step S102), the control unit 10 determines, based on the result of detection by the door open/closed state detecting unit 8, whether the opening/closing door 5 is closed (step S103). If the opening/closing door 5 is not closed (No at step S103), the control unit 10 repeats the determination processing at step S103. In contrast, if the opening/closing door 5 is closed (Yes at step S103), the control unit 10 causes the display operation unit 2 to display thereon confirmation seeking on the specified beverage, that is, a beverage to be dispensed and a guide information to prompt to press the dispensing instruction button 3 (step S104).

Thereafter, the control unit 10 determines whether the dispensing instruction button 3 is pressed (step S105). If the dispensing instruction button 3 is not pressed (No at step S105), the control unit 10 repeats the determination processing at step S105. In contrast, if the dispensing instruction button 3 is pressed (Yes at step S105), the control unit 10 causes the beverage preparing/dispensing unit 12 to prepare and dispense the specified (selected) beverage (step S106). Thereafter, the control unit 10 determines whether the beverage preparing/dispensing unit 12 has completed the beverage dispensing (step S107). If the beverage dispensing has not been completed (No at step S107), the control unit 10 returns to step S106 and continues the process of preparing and dispensing the beverage. In contrast, if the beverage dispensing has been completed (Yes at step S107), the control unit 10 returns to the start and repeats the above-described processing.

According to the first embodiment, selection of a beverage is not needed when a beverage is dispensed. As a result, a beverage purchaser is prevented from making a human error in selection, such as pressing a wrong button, whereby dispensing of beverages that would be wasted can be reduced. According to the first embodiment, after the beverage CD is read, specifics (information) of a beverage corresponding to the beverage CD thus read are displayed on the display operation unit 2, and beverage dispensing is then started after: a confirmation is obtained from a beverage purchaser; and, after a little while, the dispensing instruction button 3 is pressed. Thus, according to the first embodiment, obtaining a confirmation from a beverage purchaser prevents dispensing of a beverage that the beverage purchaser does not desire to purchase, whereby dispensing a beverage that would be wasted can be avoided. Examples of a case when the beverage purchaser dispenses a beverage not desired to be purchased include a case when miscommunication between the beverage purchaser and a store clerk results in handing of the container C not for an ordered beverage and a case when the beverage purchaser has mistakenly purchased the container C not desired to be purchased.

Detection of the container C by the container detecting unit 6 and reading of the beverage CD by the beverage reading unit 7 may be performed at the same time. In addition, the beverage reading unit 7 may double as the container detecting unit 6. That is, the beverage reading unit 7 and the container detecting unit 6 may be provided as a single constituent element.

Second Embodiment

Figure 4:
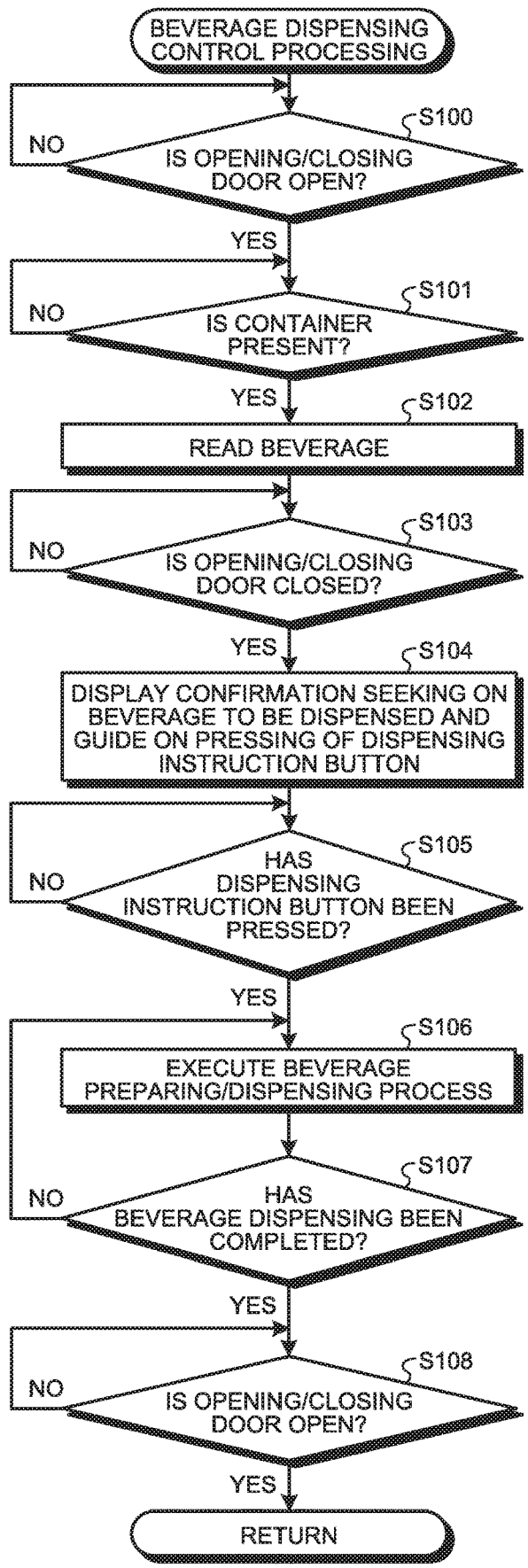
FIG. 4 is a flowchart illustrating the procedure of beverage dispensing control processing to be executed by a control unit according to a second embodiment of the present disclosure.

FIG. 4 is a flowchart illustrating the procedure of beverage dispensing control processing to be executed by the control unit 10 according to a second embodiment. In the second embodiment, while the beverage dispensing apparatus 1 has the same configuration as the beverage dispensing apparatus 1 in the first embodiment, the control unit 10 executes control the specifics (content) of which are different from those of the control in the first embodiment.

In the second embodiment, the beverage dispensing control processing in the first embodiment is executed based on the open or closed state of the opening/closing door 5. That is, as illustrated in FIG. 4, at the start, the control unit 10 determines, based on the result of detection by the door open/closed state detecting unit 8, whether the opening/closing door 5 is open (step S100). If the opening/closing door 5 is not open (No at step S100), the control unit 10 repeats the determination processing at step S100. In contrast, if the opening/closing door 5 is open (Yes at step S100), the control unit 10 proceeds to step S101, and executes the same processing as the processing at step S101 to S107 illustrated for the first embodiment.

However, if the beverage dispensing has been completed (Yes at step S107), the control unit 10 then further determines whether the opening/closing door 5 is open (step S108). If the opening/closing door 5 is not open (No at step S108), the control unit 10 repeats the determination processing at step S108. In contrast, if the opening/closing door 5 is open (Yes at step S108), the control unit 10 returns to the start and repeats the above-described processing.

Whether the opening/closing door 5 is open is determined at step S108 because, even if the beverage dispensing is completed, the next beverage dispensing cannot be executed unless a purchaser of the beverage takes out the container C into which the beverage has been dispensed. This beverage dispensing control processing includes at the start, in relation to this determination processing, processing of confirming at step S100 whether the opening/closing door 5 is open.

Third Embodiment

Figure 5:
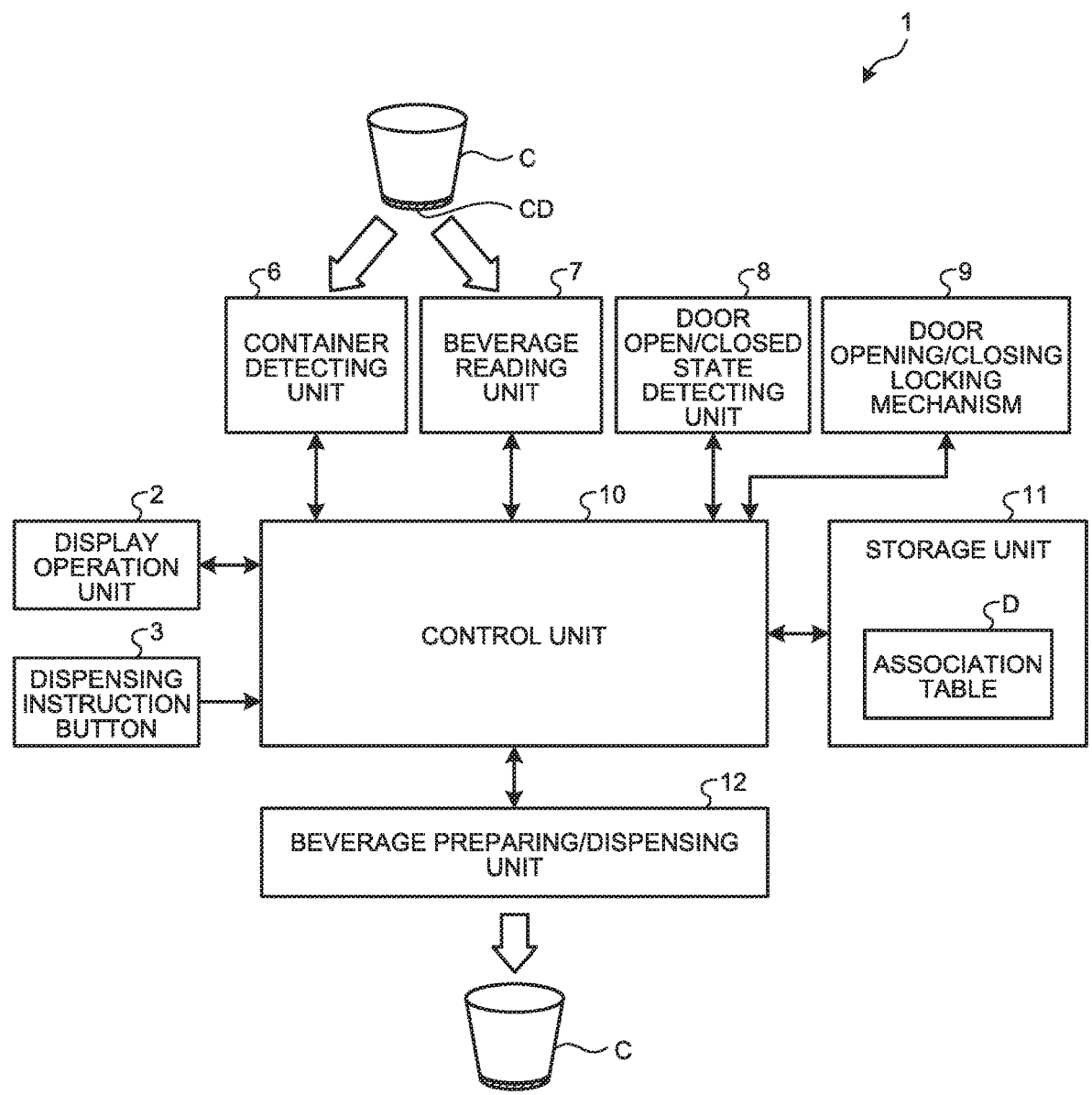
FIG. 5 is a block diagram illustrating the configuration of a control system according to a third embodiment of the present disclosure.
Figure 6:
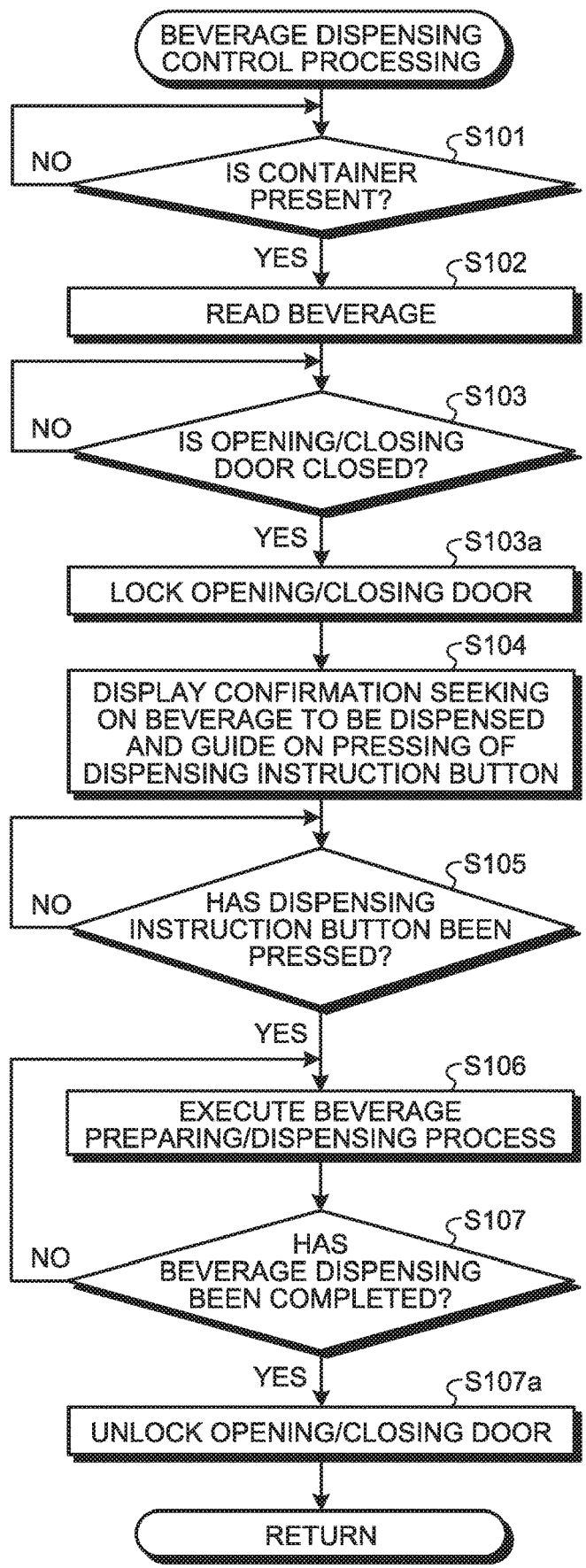
FIG. 6 is a flowchart illustrating the procedure of beverage dispensing control processing to be executed by a control unit according to the third embodiment of the present disclosure.

FIG. 5 is a block diagram illustrating the configuration of a control system according to a third embodiment. FIG. 6 is a flowchart illustrating the procedure of beverage dispensing control processing to be executed by the control unit 10 in the third embodiment. As illustrated in FIG. 5, in the third embodiment, a door opening/closing locking mechanism 9 is provided in addition to the configuration in the first embodiment.

The procedure of the beverage dispensing control processing using the door opening/closing locking mechanism 9 is described with reference to a flowchart illustrated in FIG. 6. The beverage dispensing control processing according to the third embodiment further includes a locking the opening/closing door 5 into the closed state using the door opening/closing locking mechanism 9 (step S103a) after step S103 in the beverage dispensing control processing according to the first embodiment; and unlocking the opening/closing door 5 from the closed state obtained using the door opening/closing locking mechanism 9 (step S107a) after determining whether the beverage dispensing has been completed (step S107).

As a result, according to the third embodiment, the opening/closing door 5 is forcibly maintained in the closed state during steps S104 to S107 in which the beverage is being dispensed. This prevents the container C from being carelessly taken out while the beverage is being dispensed into the container C, whereby dispensing a beverage that would be wasted can be avoided.

Fourth Embodiment

Figure 7:
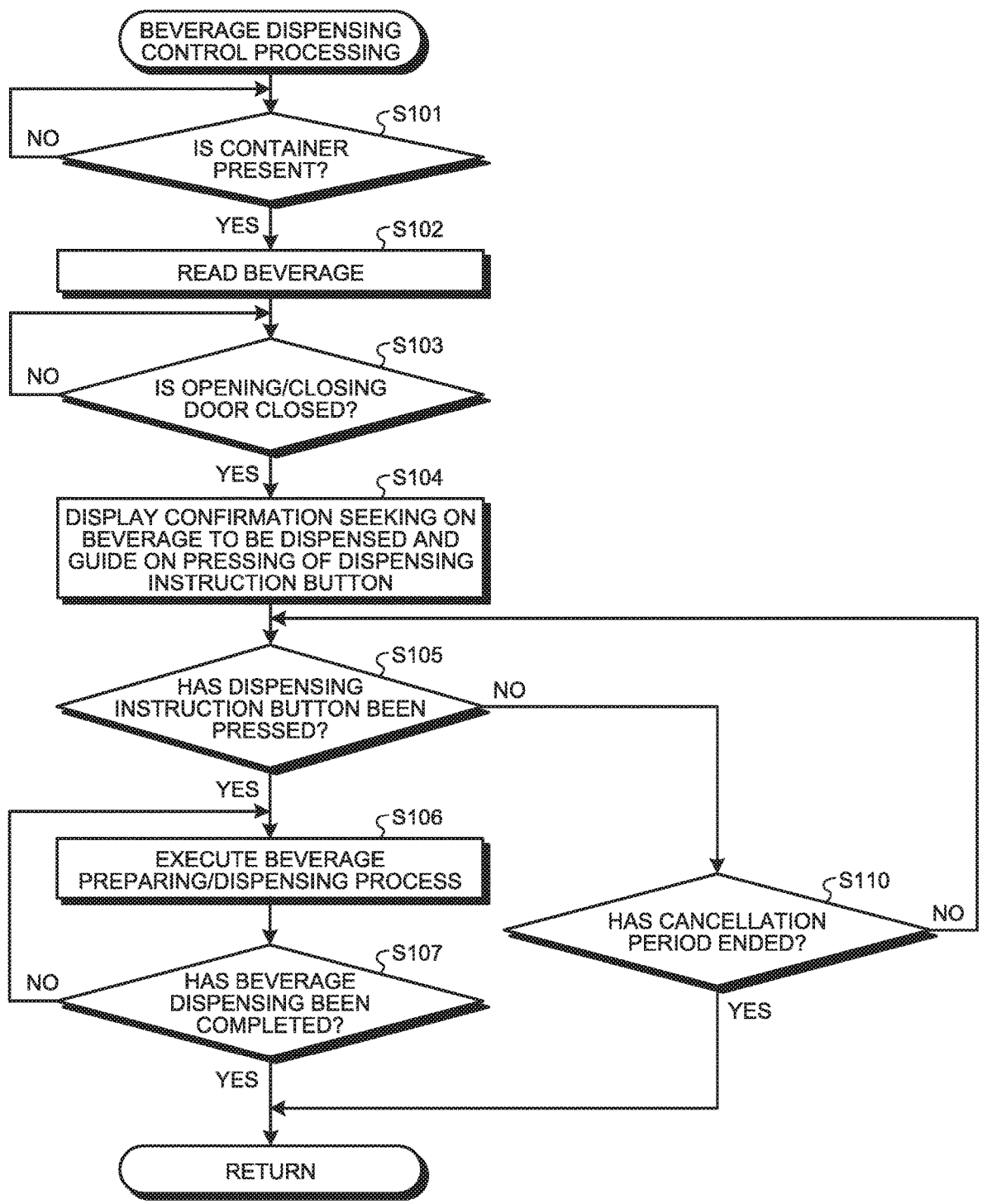
FIG. 7 is a flowchart illustrating the procedure of beverage dispensing control processing to be executed by a control unit according to a fourth embodiment of the present disclosure.

FIG. 7 is a flowchart illustrating the procedure of beverage dispensing control processing to be executed by the control unit 10 in the present fourth embodiment. As illustrated in FIG. 7, in the present fourth embodiment, the beverage dispensing control processing in the first embodiment further includes processing in which the control unit 10 determines whether a cancellation period has ended (step S110).

If the dispensing instruction button 3 has not been pressed (No at step S105), the control unit 10, instead of repeating the determination processing at step S105, determines whether the cancellation period has ended (step S110). This cancellation period is a period which starts from the time when the confirmation seeking on the beverage and the guide on pressing of the dispensing instruction button 3 are displayed at step S104. It is preferred that a guide indicating that beverage dispensing is going to be stopped be displayed on the display operation unit 2 after the cancellation period ends. If the cancellation period has not ended (No at step S110), the control unit 10 proceeds to step S105, and, if the cancellation period has passed (Yes at step S110), the control unit 10 ends the present beverage dispensing control processing.

When a beverage on which the confirmation seeking has been displayed (i.e., what is displayed as the information indicating the beverage) is not a desired beverage, a situation in which a beverage purchaser does not press the dispensing instruction button 3 continues. After the cancellation period ends, the beverage purchaser inevitably cancels purchase of the beverage on which the confirmation seeking has been displayed.

According to the fourth embodiment, this cancellation period can be used to cancel purchase of a beverage, whereby dispensing a beverage that would be wasted can be avoided.

Fifth Embodiment

Figure 8:
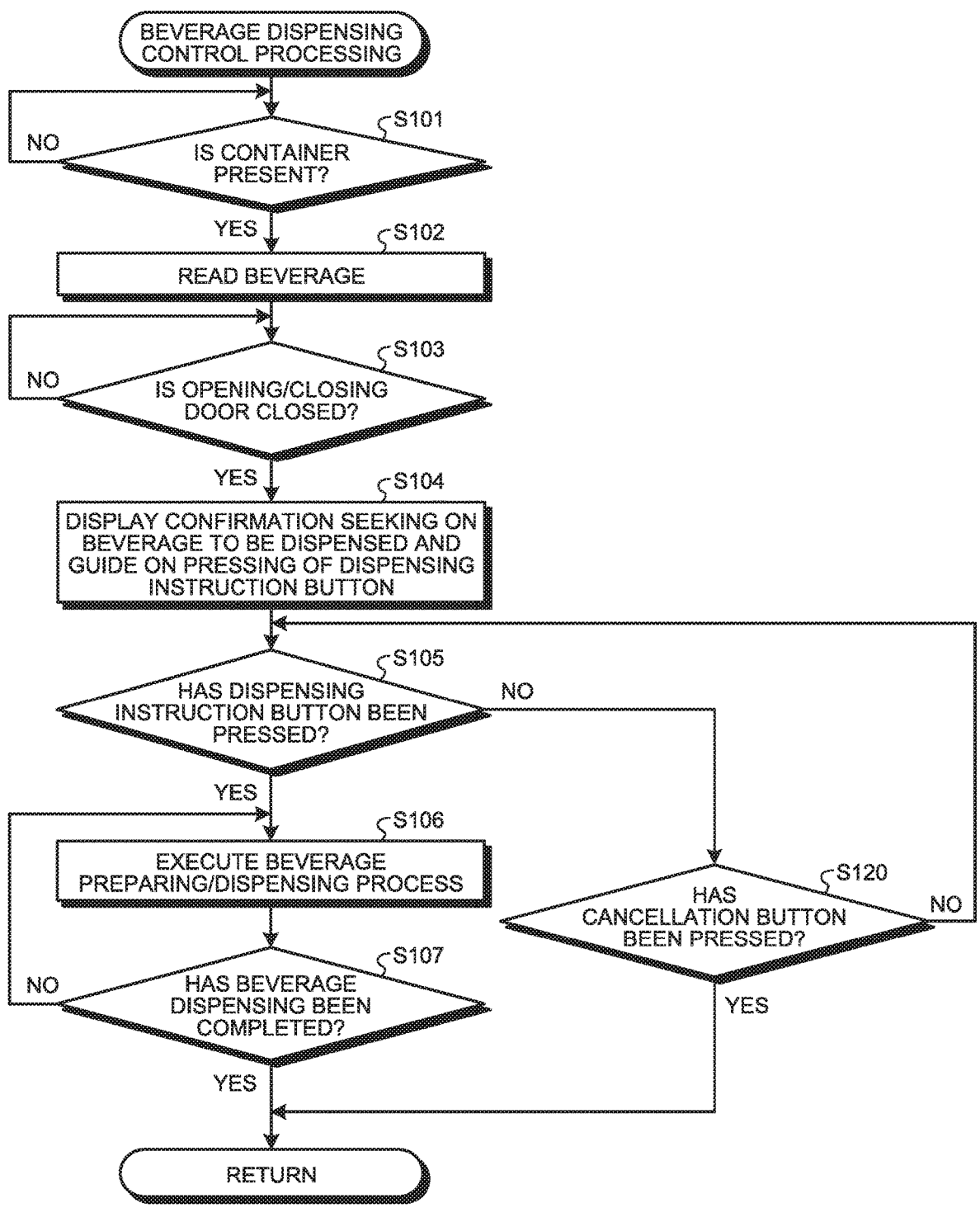
FIG. 8 is a flowchart illustrating the procedure of beverage dispensing control processing to be executed by a control unit according to a fifth embodiment of the present disclosure.

FIG. 8 is a flowchart illustrating the procedure of beverage dispensing control processing to be executed by the control unit 10 in the fifth embodiment. In the fourth embodiment described above, the cancellation period is used to cancel beverage dispensing. In fifth embodiment, instead, a cancellation button not illustrated is provided in the neighborhood of the dispensing instruction button 3, and beverage dispensing is canceled if this cancellation button is pressed. The cancellation button may be, in the same manner as the dispensing instruction button 3 may be, a graphic user interface (GUI) button on the display operation unit 2.

That is, if the dispensing instruction button 3 is not pressed (No at step S105), the control unit 10, instead of repeating the determination processing at step S105, determines whether the cancellation button is pressed (step S120). If the cancellation button is not pressed (No at step S120), the control unit 10 proceeds to step S105, and, if the cancellation button is pressed (Yes at step S120), the control unit 10 ends the present beverage dispensing control processing. It is preferred that a guide presenting such a message as "Press the cancellation button for not purchasing the beverage" be displayed on the display operation unit 2.

When a beverage on which the confirmation seeking has been displayed is not a desired beverage, the beverage purchaser presses the cancellation button to cancel purchase of the beverage on which the confirmation seeking has been displayed.

According to the fifth embodiment, the cancellation button can be used to cancel purchase of a beverage, whereby dispensing a beverage that would be wasted can be avoided.

Sixth Embodiment

Figure 9:
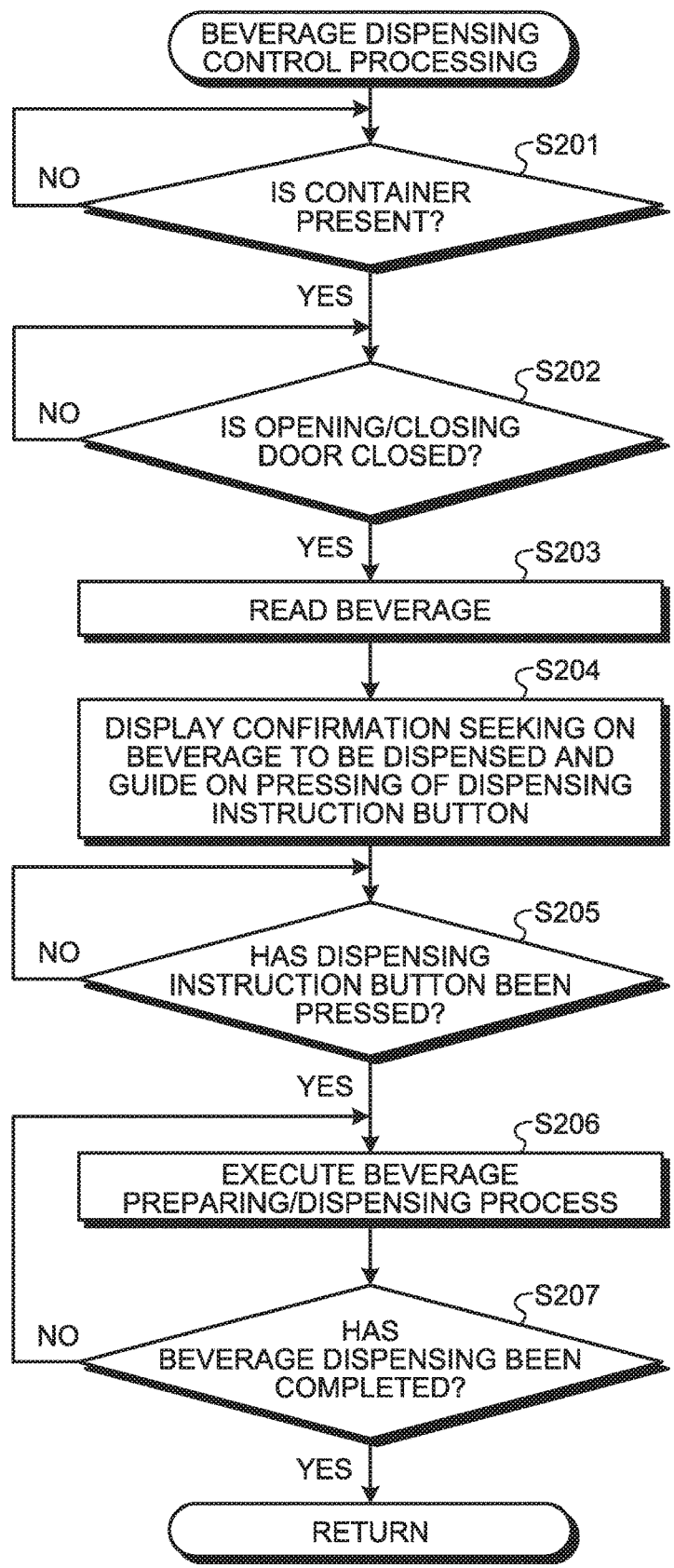
FIG. 9 is a flowchart illustrating the procedure of beverage dispensing control processing to be executed by a control unit according to a sixth embodiment of the present disclosure.

FIG. 9 is a flowchart illustrating the procedure of beverage dispensing control processing to be executed by the control unit 10 in the present sixth embodiment. In the first embodiment described above, whether the opening/closing door 5 is closed is determined (step S103) after the beverage CD is read (step S102). In the sixth embodiment, instead, the beverage CD is read (step S203) after whether the opening/closing door 5 is closed is determined (step S202). The other processing at step S201 and S204 to S207 are the same as the processing at steps S101 and S104 to S107 in the first embodiment.

In the sixth embodiment, the beverage CD is read (step S203) if the opening/closing door is closed (Yes at step S202), whereby the beverage reading unit 7 is brought into a state suitable for reading the beverage CD provided that the opening/closing door 5 is in the closed state. Reading the beverage CD provided that the opening/closing door 5 is in the closed state means, for example, a case in which, while the beverage reading unit 7 is an optical sensor and uses reflection of the opening/closing door 5 to detect the beverage CD.

Seventh Embodiment

Figure 10:
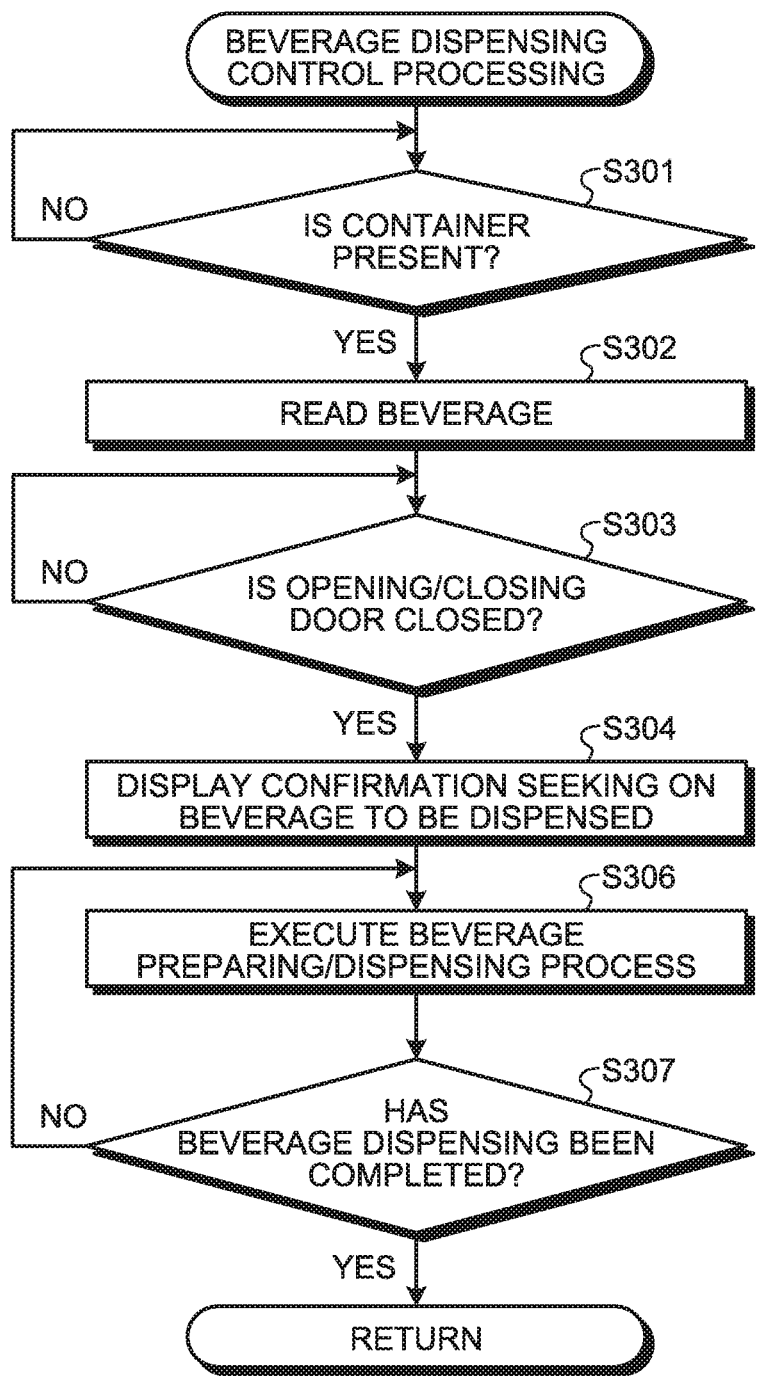
FIG. 10 is a flowchart illustrating the procedure of beverage dispensing control processing to be executed by a control unit according to a seventh embodiment of the present disclosure.

FIG. 10 is a flowchart illustrating the procedure of beverage dispensing control processing to be executed by the control unit 10 according to a seventh embodiment. In the first embodiment described above, the beverage preparing/dispensing process (step S106) is carried out provided that the dispensing instruction button 3 has been pressed (step S105). In the seventh embodiment, instead, the beverage preparing/dispensing process is carried out (step S306) immediately after the confirmation seeking on a beverage to be dispensed is displayed (step S304). That is, in the present seventh embodiment, the dispensing instruction button 3 is not provided, and pressing the dispensing instruction button 3 in a manner corresponding to step S105 is not a condition to start the beverage preparing/dispensing process. Instead, the beverage preparing/dispensing process is started immediately after the confirmation seeking on a beverage to be dispensed is displayed (step S304). Thus, at step S304, the guide on pressing of the dispensing instruction button 3 is not displayed. The other processing at steps S301 to S303, S306, and S307 are the same as the processing at steps S101 to S103, S106, and S107 in the first embodiment.

According to the seventh embodiment, beverages can be dispensed quickly, and dispensing of beverages that would be wasted can be reduced because a wrong button cannot be pressed in selecting a beverage.

Eighth Embodiment

Figure 11:
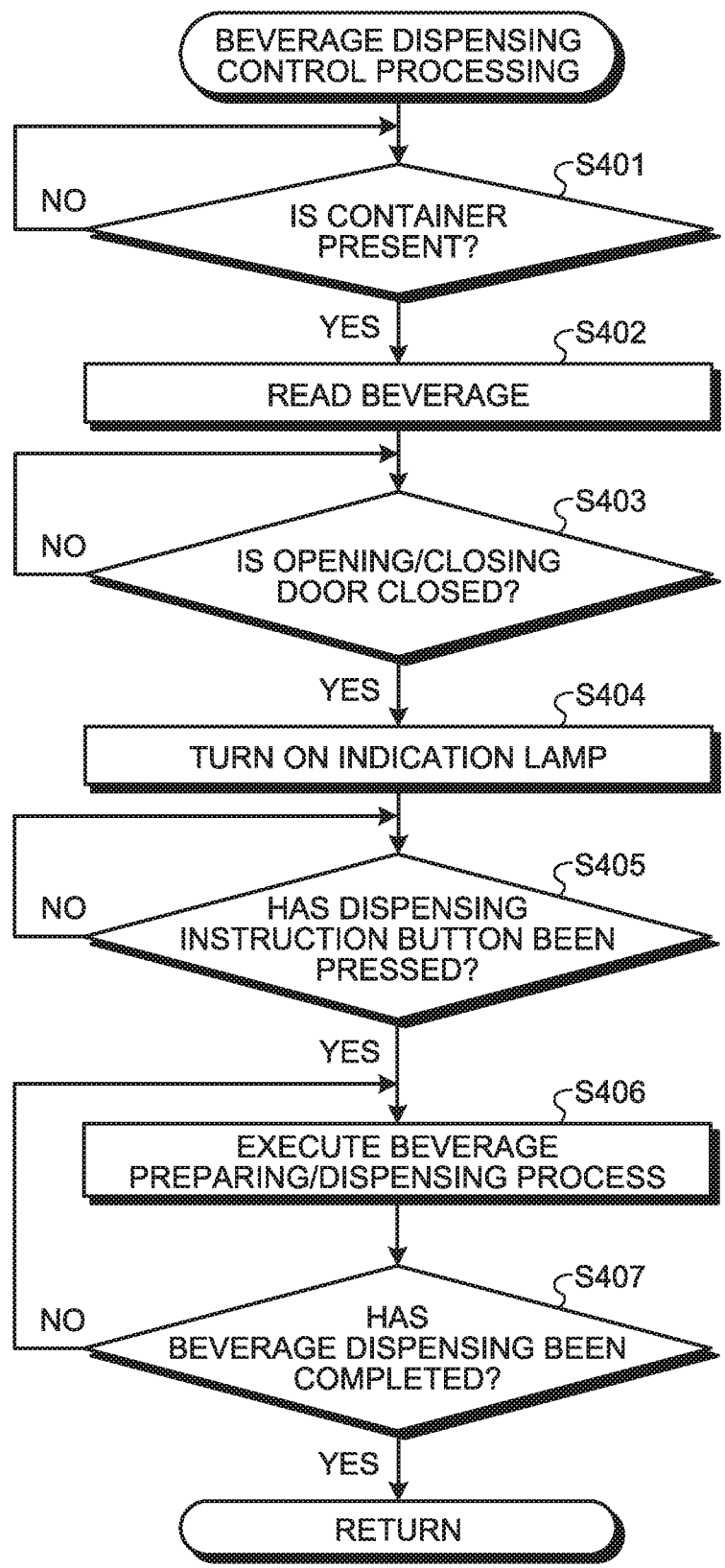
FIG. 11 is a flowchart illustrating the procedure of beverage dispensing control processing to be executed by a control unit according to an eighth embodiment of the present disclosure.

FIG. 11 is a flowchart illustrating the procedure of beverage dispensing control processing to be executed by the control unit 10 according to an eighth embodiment. In the eighth embodiment, at least one indication lamp, such as a light-emitting diode (LED), (not illustrated) is provided in surrounding of the dispensing instruction button 3, the control unit 10 lights one of the at least one indication lamp (step S404) instead of displaying the confirmation seeking on a beverage to be dispensed and the guide on pressing of the dispensing instruction button 3 at step S104 in the first embodiment. The other processing at steps S401 to S403 and S405 to S407 are the same as the processing at steps S101 to S103 and S105 to S107 in the first embodiment.

This lighting of the indication lamp indicates a guide to the effect that the beverage CD is read and that identification of the beverage CD has been completed. After confirming that this indication lamp is lit, the beverage purchaser can start the beverage preparing/dispensing process by pressing the dispensing instruction button 3.

In order to have the confirmation seeking displayed at step S104 using the indication lamp, the indication lamps can be provided corresponding to respective kinds of beverage so that the indication lamp that corresponds to the identified beverage can be lit.

Ninth Embodiment

Figure 12:
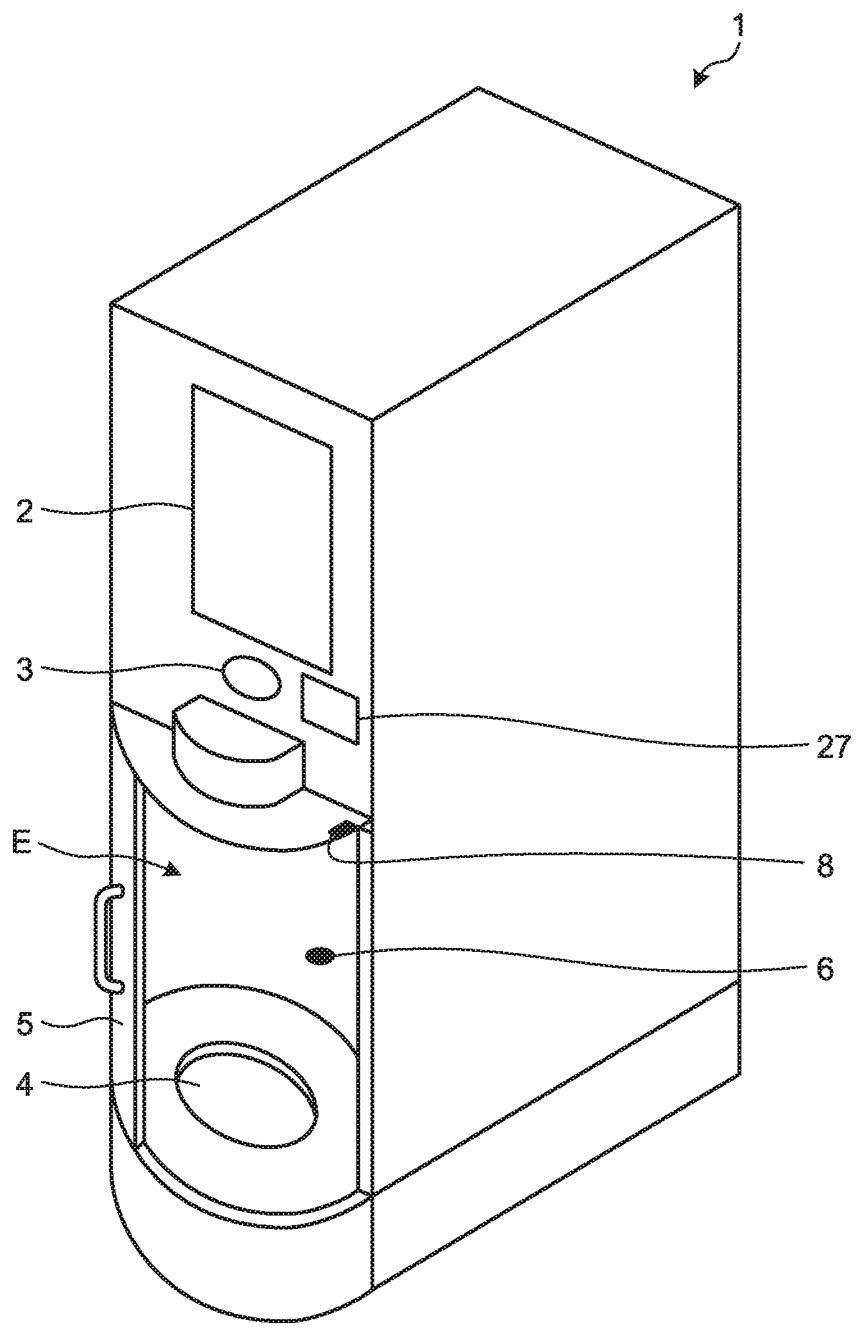
FIG. 12 is a perspective view illustrating the exterior configuration of a beverage dispensing apparatus according to a ninth embodiment of the present disclosure.
Figure 13:
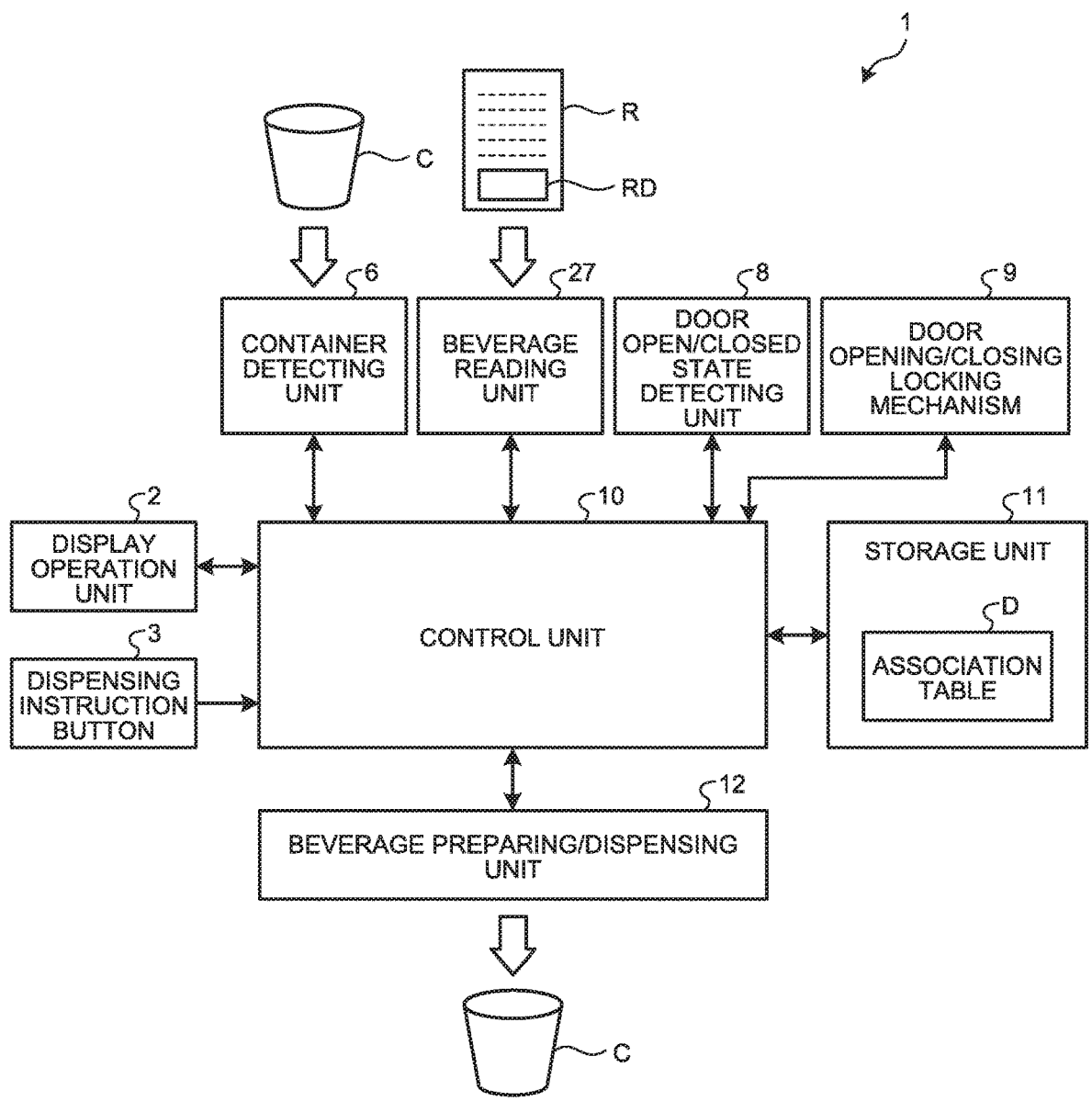
FIG. 13 is a block diagram illustrating the configuration of a control system in the beverage dispensing apparatus illustrated in FIG. 12.
Figure 14:
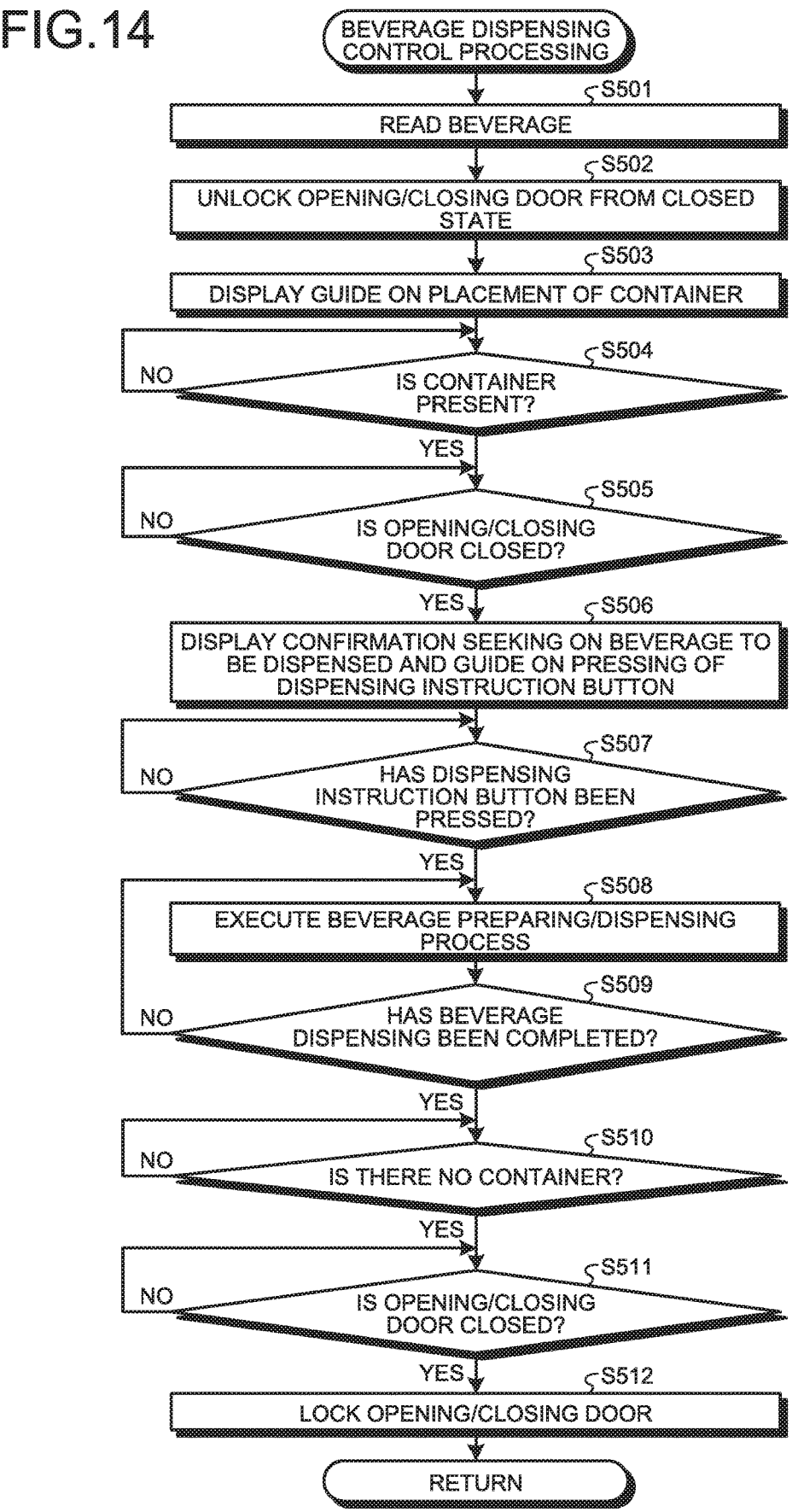
FIG. 14 is a flowchart illustrating the procedure of beverage dispensing control processing to be executed by a control unit according to the ninth embodiment of the present disclosure.

FIG. 12 is a perspective view illustrating the exterior configuration of a beverage dispensing apparatus 1 according to a ninth embodiment. FIG. 13 is a block diagram illustrating the configuration of a control system in the beverage dispensing apparatus 1 illustrated in FIG. 12. FIG. 14 is a flowchart illustrating the procedure of beverage dispensing control processing to be executed by the control unit 10 in the ninth embodiment. As illustrated in FIG. 12 and FIG. 13, in the ninth embodiment, a beverage reading unit 27 is provided on an external surface of the beverage dispensing apparatus 1 is provided in place of the beverage reading unit 7 in the dispensing area E illustrated in the first embodiment. Specifically, the beverage reading unit 27 is provided below the display operation unit 2 and in the neighborhood of the dispensing instruction button 3. In the ninth embodiment, the door opening/closing locking mechanism 9 illustrated in the third embodiment is also provided.

As illustrated in FIG. 13, a beverage Receipt Data (RD) corresponds to each of the beverages CD and is indicated on a part, for example, the lower part, of a receipt that is given when the beverage is purchased. When the beverage purchaser waves the beverage RD on the received receipt R over the beverage reading unit 27, the beverage reading unit 27 reads (information of) the beverage RD. The container C is being placed in the neighborhood of and separately from the beverage dispensing apparatus 1. That is, the container C and the beverage RD are separate from each other in the ninth embodiment.

The procedure of beverage dispensing control processing according to the ninth embodiment is described with reference to a flowchart illustrated in FIG. 14. As illustrated in FIG. 14, at the start, the beverage reading unit 27 reads the beverage RD (step S501). The control unit 10 then unlocks, from the locked state, the opening/closing door 5 that has been locked in the closed state while being on standby (step S502). The display operation unit 2 then displays the guide on placement of a container C (step S503). Subsequently, the control unit 10 determines whether the container detecting unit 6 detects the presence of the container C (step S504). If the presence of the container C is not detected (No at step S504), the control unit 10 repeats the determination processing at step S504. In contrast, if the presence of the container C is detected (Yes at step S504), the door open/closed state detecting unit 8 further determines whether the opening/closing door 5 is closed (step S505).

The processing at step S505 to S509 thereafter are the same as the processing at steps S103 to S107 illustrated in the first embodiment.

If the beverage dispensing at step S508 has been completed (Yes at step S509), the control unit 10 further determines whether the container detecting unit 6 detects the absence of the container C (step S510). If the container C is present (No at step S510), the control unit 10 repeats this determination processing. If the container C is absent (i.e., not present) (Yes at step S510), it is further determined whether the opening/closing door 5 is closed (step S511). If the opening/closing door 5 is not closed (No at step S511), the control unit 10 repeats this determination processing. If the opening/closing door 5 is closed (Yes at step S511), the control unit 10 actuates the door opening/closing locking mechanism 9 to lock the opening/closing door 5 into the closed state (step S512), returns to the start, and repeats the above-described processing.

Preferably, the opening/closing door 5 has a mechanism capable of automatically opening and closing the opening/closing door 5. In such a case, the opening/closing door 5 operates in the following manner: the opening/closing door is automatically open at the same time as the opening/closing door 5 is unlocked after the beverage is read at step S501; and the opening/closing door 5 is automatically closed and locked if the container C is absent at step S510.

In the ninth embodiment, the beverage RD may be provided not separately from the corresponding container C by being attached to the container C. In the ninth embodiment, the beverage RD needs only to be read by the beverage reading unit 27 provided on the apparatus external surface before the container C is detected by the container detecting unit 6. Accordingly, the beverage CD illustrated in the first to the eighth embodiments can be read by the beverage reading unit 27 in the same manner as the beverage RD and is thus applicable to the present ninth embodiment.

According to the ninth embodiment, even in the case in which the beverage RD is read by the beverage reading unit 27 provided on the external surface of the apparatus, selection of a beverage is not involved when a beverage is dispensed as in the case of the first embodiment. As a result, a human error in selection, such as pressing a wrong button of a beverage purchaser, can be prevented from occurring, whereby dispensing of beverages that would be wasted can be reduced. According to the ninth embodiment, after the beverage RD is read, specifics of a beverage corresponding to the beverage RD thus read are displayed on the display operation unit 2, and beverage dispensing is then started only after a confirmation is obtained from the beverage purchaser and, after a little while, the dispensing instruction button 3 is pressed. Thus, according to the ninth embodiment, obtaining a confirmation from a beverage purchaser prevents dispensing of a beverage that the beverage purchaser does not desire to purchase, whereby dispensing a beverage that would be wasted can be avoided. Furthermore, according to the ninth embodiment, the opening/closing door 5 is locked when the beverage dispensing apparatus 1 is on standby, whereby misbehavior can be prevented while when the beverage dispensing apparatus 1 is on standby.

Tenth Embodiment

Figure 15:
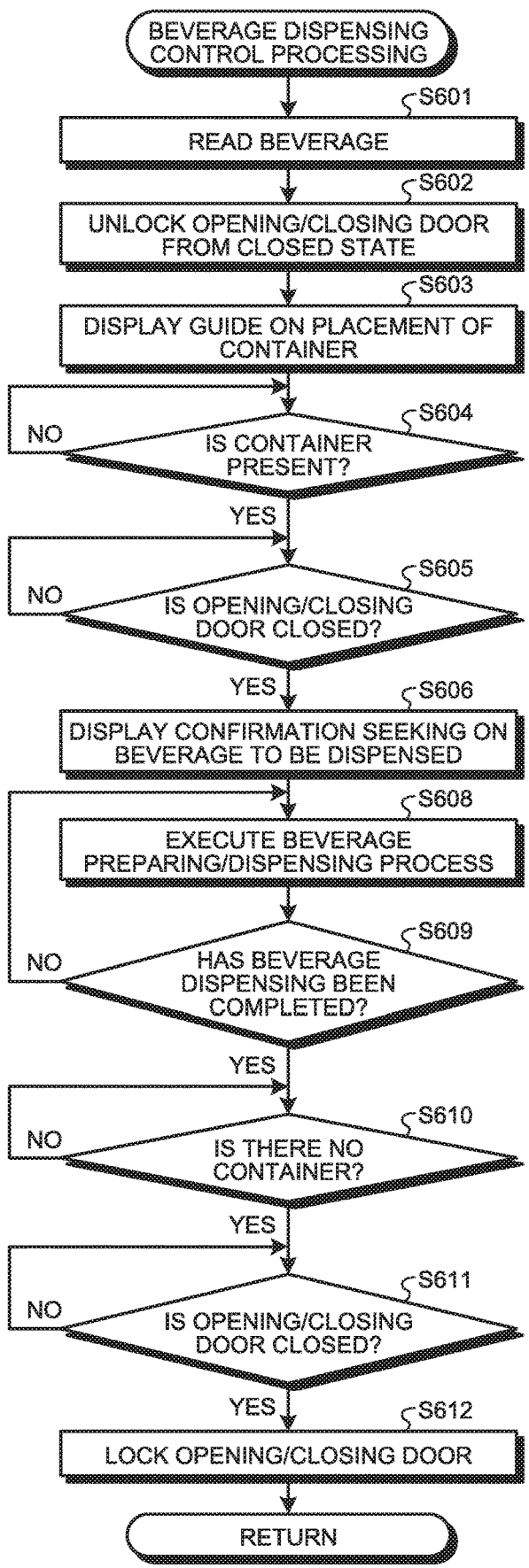
FIG. 15 is a flowchart illustrating the procedure of beverage dispensing control processing to be executed by a control unit according to a tenth embodiment of the present disclosure.

FIG. 15 is a flowchart illustrating the procedure of beverage dispensing control processing to be executed by the control unit 10 according to a tenth embodiment. The tenth embodiment is obtained by applying the processing steps in the seventh embodiment to those in the ninth embodiment. That is, in the tenth embodiment, the beverage preparing/dispensing process is carried out (step S608) immediately after the confirmation seeking on a beverage to be dispensed is displayed (step S606). That is, in the tenth embodiment, the dispensing instruction button 3 is not provided, and pressing the dispensing instruction button 3 in a manner corresponding to step S506 is not a condition to start the beverage preparing/dispensing process. Instead, the beverage preparing/dispensing process is started (step S608) immediately after the confirmation seeking on a beverage to be dispensed is displayed (step S606). Thus, at step S606, the guide on pressing of the dispensing instruction button 3 is not displayed. The other processing at steps S601 to S605 and S608 to S612 are the same as the processing at steps S501 to S505 and S508 to S512 in the ninth embodiment.

According to the tenth embodiment, beverages can be dispensed quickly as in the case of the seventh embodiment, and dispensing of beverages that would be wasted can be reduced because a wrong button cannot be pressed in selection of a beverage.

In the first to the tenth embodiments described above, the container detecting unit 6 detects the lower part of the container C to detect whether the container is present or absent. However, this example is not limiting. The container detecting unit 6 may detect the bottom part of the container C to detect whether the container is present or absent. Alternatively, the container detecting unit 6 may be, for example, a weight sensor that detects the weight difference between a weight sensed when the container C is placed on the platform 4 and a weight sensed when the container C is not placed thereon. Further alternatively, when the containers C that have radio-frequency identification (RFID) tags embedded therein, whether the container is present or absent may be detected based on whether the RFID tag is detected or not. In this case, the RFID tags may retain the corresponding beverages CD or RD, and the container detecting unit 6 may have the function of the beverage reading unit 7.

Figure 16:
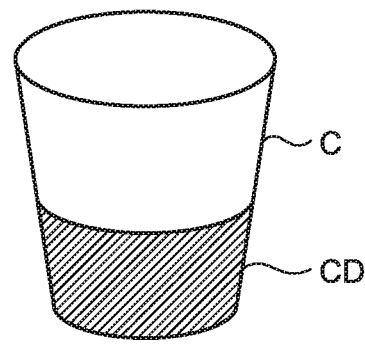
FIG. 16 illustrates an example in which a container has a reading target that indicates a beverage attached on a side part of a container with the reading target colored differently by beverage.

In the first to the eighth embodiments described above, respective colors corresponding to beverages are attached to the bottom part of the container C as the beverages CD. In the first to the tenth embodiments, however, a position where each of the beverages CD is attached is not limited to the bottom part of the container C and may be a side part of the container C as illustrated in FIG. 16. Alternatively, the entire container C may have a color corresponding to the corresponding beverage.

Alternatively, a beverage that is attached to the container C is not limited to a color and may have a pattern as described above.

Further alternatively, each of the beverages CD may be a combination of at least one of the shape, the material, and the color of the container C itself.

Figure 17:
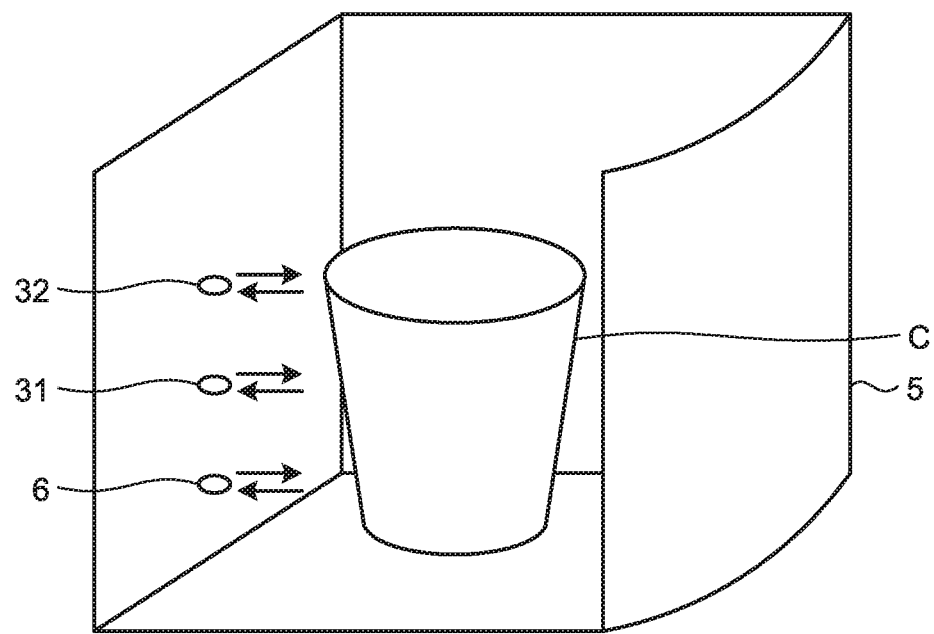
FIG. 17 illustrates an example of the arrangement of beverage reading units when a reading target indicating a beverage is a combination of the shape of a container and whether the container is transparent or non-transparent.

For example, in FIG. 17, a combination of the shape of the container C and whether the container C is transparent or non-transparent is used as (information indicating) a beverage. In FIG. 17, an optical sensor 31 detects whether the container C is transparent or non-transparent, and an optical sensor 32 detects the height of the container C. While a beverage corresponding to the container C that is transparent is iced coffee to be dispensed into a transparent container having ice packed therein, a beverage corresponding to the container C that is non-transparent is hot coffee to be dispensed into a non-transparent container. The height of the container C is detected because the amount of a beverage to be dispensed is larger when the height is larger. For example, when the container C indicates a beverage that is non-transparent and has a large height, hot coffee in a certain large volume is to be dispensed.

Eleventh Embodiment

Figure 18:
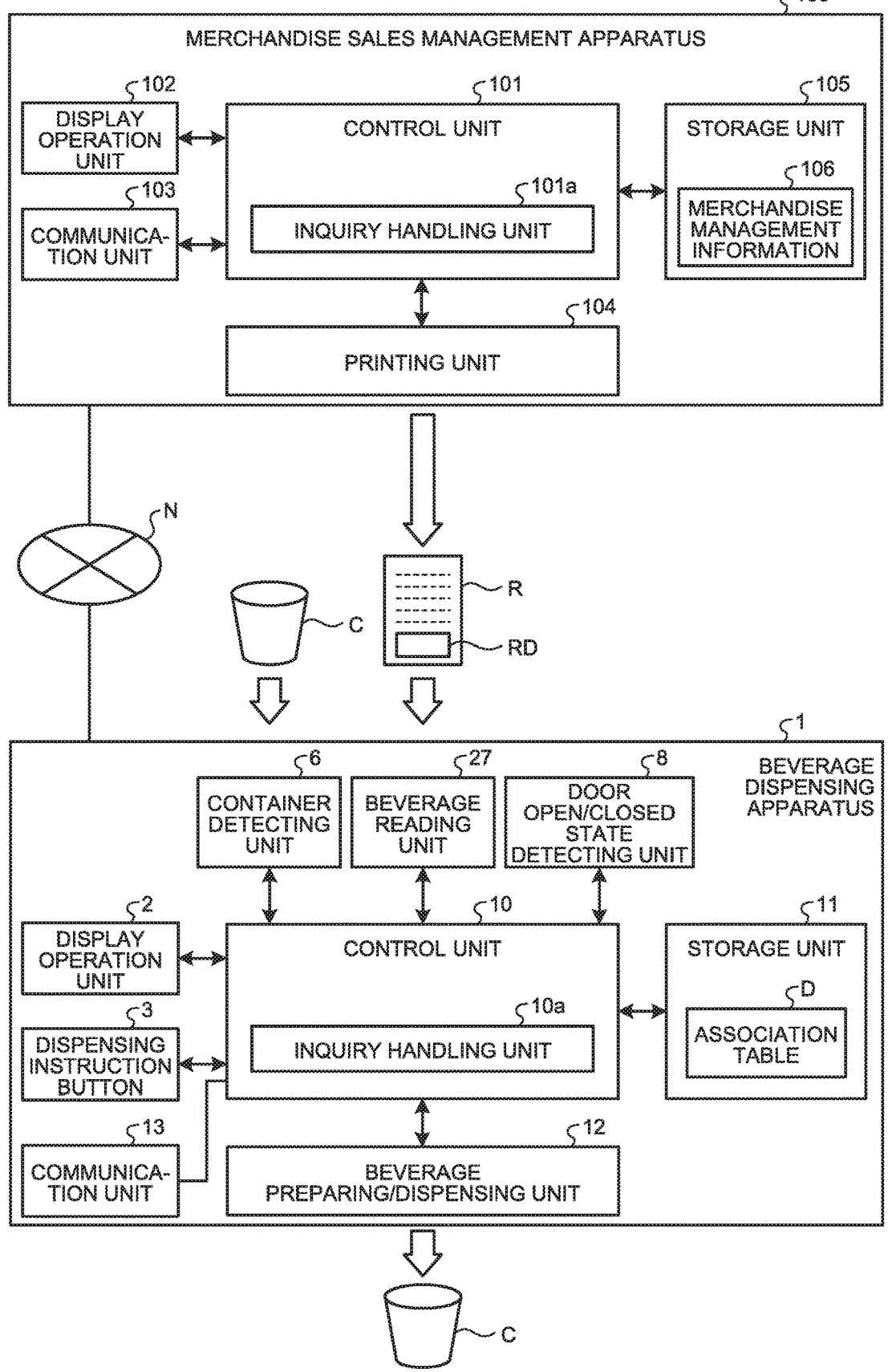
FIG. 18 is a block diagram illustrating a beverage dispensing system according to an eleventh embodiment of the present disclosure.

FIG. 18 is a block diagram illustrating a beverage dispensing system according to an eleventh embodiment of the present disclosure. As illustrated in FIG. 18, the beverage dispensing system includes the beverage dispensing apparatus 1 and a merchandise sales management apparatus 100 which are connected to a network N such as an intra-store network. The merchandise sales management apparatus 100 is an apparatus such as a point-of-sale (POS) register. The beverage dispensing apparatus 1 is configured in the same manner as the beverage dispensing apparatus 1 illustrated in FIG. 13 with the door opening/closing locking mechanism 9 eliminated.

The merchandise sales management apparatus 100 includes a control unit 101, a display operation unit 102, a communication unit 103, a printing unit 104, and a storage unit 105. The display operation unit 102 is used for inputting operations on various kinds of information and outputs various kinds of information by displaying the information. The communication unit 103 is a communication interface unit that connects to and communicates with the beverage dispensing apparatus 1 via the network N. The printing unit 104 outputs various kinds of information by printing the information and, in particular, outputs the receipts R having the beverages RD by printing the receipts R. The storage unit 105 stores therein information on sold merchandise items, for example, the beverage RD as merchandise management information 106.

The control unit 101 is a control unit that controls the entire merchandise sales management apparatus 100 and includes an inquiry handling unit 101a. Upon receiving an inquiry about a merchandise item corresponding to any of the beverages RD from the beverage dispensing apparatus 1, the inquiry handling unit 101a refers to the merchandise management information 106 and provides information on the merchandise item corresponding to the beverage RD.

The beverage dispensing apparatus 1 includes a communication unit 13. The communication unit 13 is a communication interface unit that connects to communicate with the merchandise sales management apparatus 100 via the network N. The control unit 10 includes an inquiry handling unit 10a. Upon reading any of the beverages RD by the beverage reading unit 27, the inquiry handling unit 10a inquires of the merchandise sales management apparatus 100 about information on a merchandise item corresponding to the beverage RD and acquires information on the merchandise item corresponding to the beverage RD from the merchandise sales management apparatus 100. Based on the acquired information on the merchandise item corresponding to the beverage RD, the control unit 10 enables the dispensing instruction button 3 that corresponds to the beverage RD to be sold and disables the dispensing instruction buttons 3 that do not correspond to that beverage RD. As the dispensing instruction buttons 3, a plurality of dispensing instruction buttons 3 are provided corresponding to kinds of the beverages RD.

Figure 19:
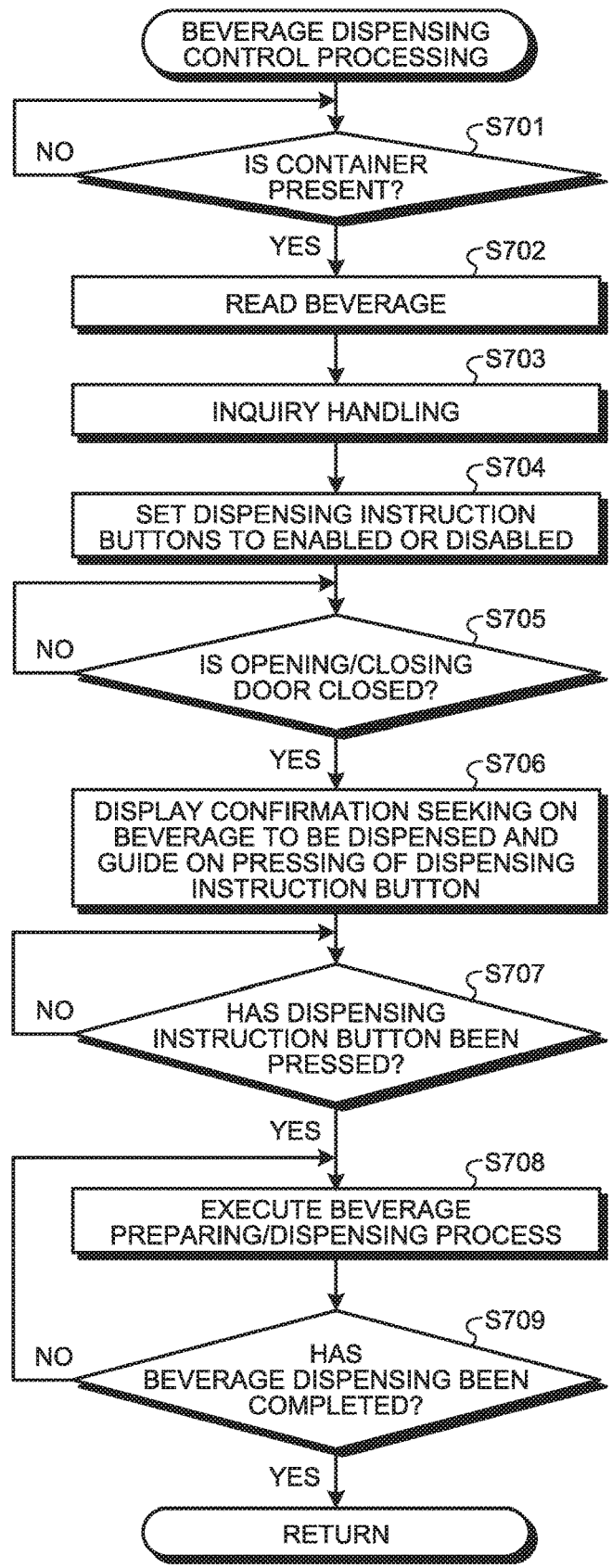
FIG. 19 is a flowchart illustrating the procedure of beverage dispensing control processing in a beverage dispensing apparatus in the beverage dispensing system illustrated in FIG. 18.

Next, the procedure of beverage dispensing control processing according to the beverage dispensing apparatus 1 in the beverage dispensing system is described with reference to a flowchart illustrated in FIG. 19. Steps S701, S702, and S705 to S709 illustrated in FIG. 19 correspond to step S101 to S107 illustrated in FIG. 3. As illustrated in FIG. 19, in the present eleventh embodiment, after the beverage reading unit 27 reads the beverage RD (step S702), the inquiry handling unit 10a inquires of the merchandise sales management apparatus 100 about a merchandise item RD and acquires information on a merchandise item corresponding to the merchandise item RD (step S703). Thereafter, based on the result of the inquiry, the control unit 10 sets the dispensing instruction buttons 3 to enabled or disabled states corresponding to the merchandise item RD (step S704). The control unit 10 then proceeds to step S705.

According to the eleventh embodiment, the beverage dispensing apparatus 1 and the merchandise sales management apparatus 100 are connected to communicate with each other, linkage processing is executed in which inquiry and confirmation are made on a merchandise item RD read by the beverage dispensing apparatus 1 with reference to merchandise items RD in the merchandise management information 106 stored in the merchandise sales management apparatus 100 is executed, the dispensing instruction button 3 that corresponds to the merchandise item RD is enabled, and the dispensing instruction button 3 that does not correspond to the merchandise item RD is disabled. Thus, only a merchandise item that corresponds to the merchandise item RD can be sold without fail, and merchandise items that do not correspond to the merchandise item RD can be prevented from being sold.

The beverages RD provided on the receipts R may be simply merchandise sales codes. In such a case, detailed information on respective merchandise items corresponding to the beverages RD have been stored in the merchandise management information 106 in the merchandise sales management apparatus 100.

Figure 20:
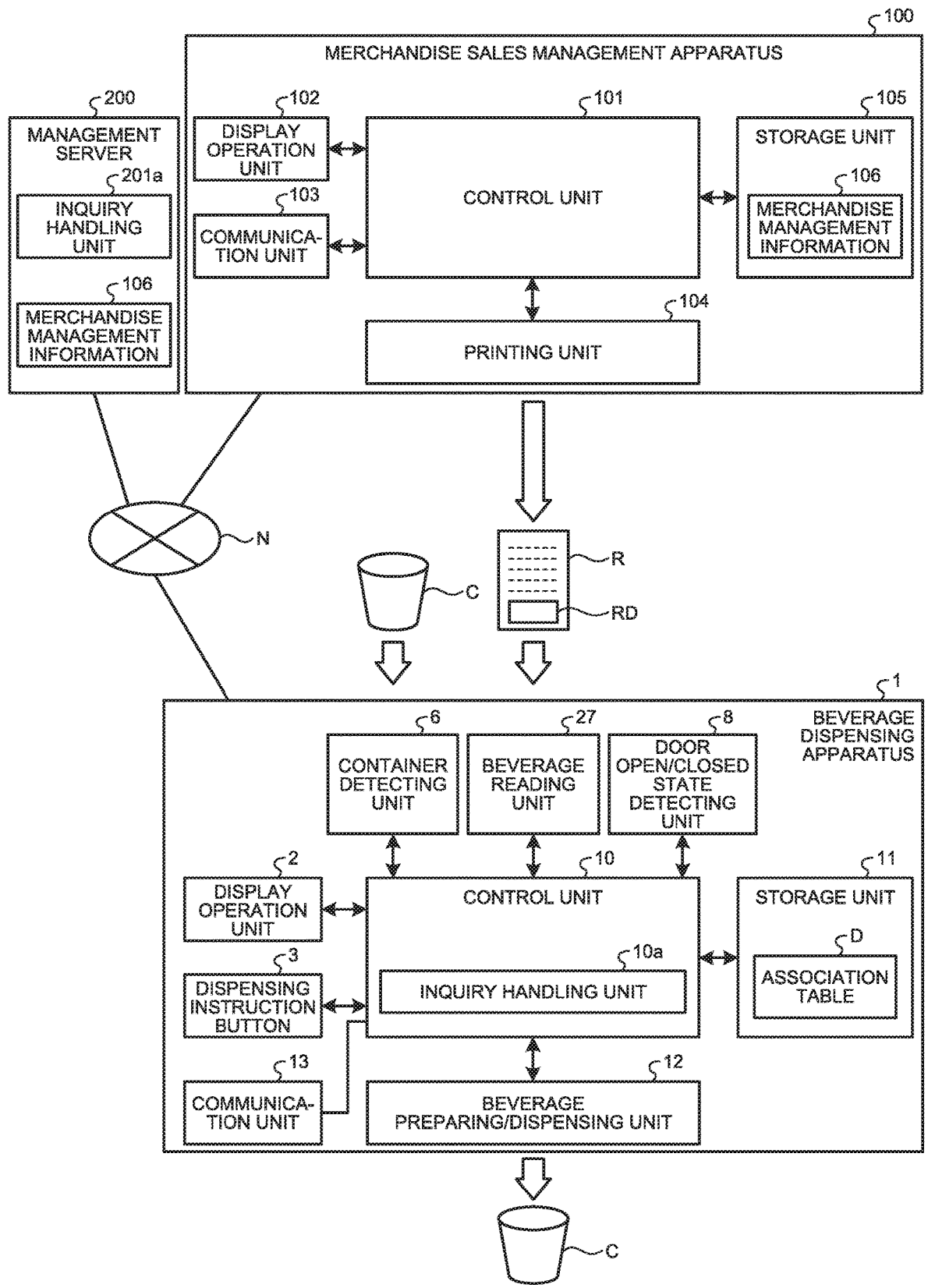
FIG. 20 is a block diagram illustrating the configuration of a beverage dispensing system as a modification of the eleventh embodiment of the present disclosure.

As illustrated in FIG. 20, a management server 200 connected to the network N may be further included, and the beverage dispensing apparatus 1 may inquire of the management server 200 for the merchandise item RD with the management server 200 informed previously of the merchandise management information 106 by the merchandise sales management apparatus 100. An inquiry handling unit 201a in the management server 20, in the same manner as the inquiry handling unit 101a in the merchandise sales management apparatus 100 does, informs the beverage dispensing apparatus 1 of information on a merchandise item corresponding to the beverage RD.

In the above-described embodiments, preferably, the control unit 10 continues to cause the container detecting unit 6 to detect the container C even after causing the beverage preparing/dispensing unit 12 to start preparing and dispensing a beverage and stops dispensing the beverage if the placement of the container C is not detected. After causing the beverage preparing/dispensing unit 12 to start preparing and dispensing, if placement of the container C is not detected by the container detecting unit 6, the control unit 10 may output an alarm to inform the occurrence of an abnormality at the same time as or without stopping dispensing a beverage. Examples of outputting an alert include: displaying the occurrence of an abnormality; calling someone in charge; outputting a beep sound; e-mail transmission; and lighting a lamp.

With this beverage dispensing apparatus, even if the beverage dispensing apparatus does not have the opening/closing door 5, misbehavior such as stealing the container C into which a beverage has been dispensed can be prevented. In addition, generation of waste by disposal of prepared beverages can be prevented, and the safety can be secured while a beverage is being dispensed.

Even if the beverage dispensing apparatus has the opening/closing door 5, when the opening/closing door 5 opens while a beverage is being dispensed, the control unit 10 preferably stops dispensing a beverage. When the opening/closing door 5 opens while a beverage is being dispensed, the control unit 10 may output an alarm to inform the occurrence of an abnormality at the same time as or without stopping dispensing a beverage.

In such a case, if the door opening/closing locking mechanism 9 is broken or out of order, misbehavior such as stealing the container C into which a beverage has been dispensed can be prevented. In addition, generation of waste by disposal of prepared beverages can be prevented, and the safety can be secured while a beverage is being dispensed.

Furthermore, the beverage reading unit 7 is configured to read a combination of at least one of the shape, the material, and the color of a purchased container itself in the above-described embodiments but may be configured to read a combination of at least one of the above characteristics and the weight and the temperature of the container C. For example, the weight of the container C can be read by causing an internally embedded weight sensor or the like to detect the weight of the container C, whereby information on whether the content of the container C is empty but to be a hot beverage or is ice sealed inside and to be a cold beverage. Likewise, the temperature of the container C can be read by causing an internally embedded temperature sensor or the like to detect the temperature of the container C, whereby information on whether the content of the container C is empty and to be a hot beverage or is ice sealed inside and to be a cold beverage.

This configuration enables the beverage reading unit 7 to read information on the beverage with higher accuracy.

The constituent elements in the first to eleventh embodiments can be combined as appropriate.

According to the present disclosure, a beverage reading unit reads a beverage purchased among a plurality of beverages that include kinds of beverage that can be dispensed and volumes thereof, and a control unit prepares the beverage and dispenses the prepared beverage into a container after, in order to seek a confirmation, displaying specifics of the beverage read by the beverage reading unit on the display unit. A human error in selection, such as pressing a wrong button, can be thus prevented in using of a beverage dispensing apparatus. Additionally, dispensing beverages that would be wasted can be prevented.

Although the present disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. A beverage dispensing apparatus for preparing a beverage and dispensing the prepared beverage into a container, the beverage dispensing apparatus comprising:
   a beverage reading device configured to read information specifying a single beverage, the information including at least one of a shape, a material, a color of the entire container, a weight and a temperature, or any combination thereof, of the container, to thereby specify a kind and a volume of the single beverage that has been purchased;
   a display operation device configured to display thereon the information indicating the beverage; and
   a control device configured to perform control to cause the display operation device to display the information indicating the beverage, and to cause the beverage to be prepared and dispensed into the container.

2. The beverage dispensing apparatus according to claim 1, further comprising:
   a dispensing instruction button for receiving an instruction to prepare and dispense the beverage, wherein
   the control device is configured to perform control to prepare the beverage and start dispensing the prepared beverage into the container, responsive to
      the beverage reading device reading the information indicating the beverage,
      the information indicating the beverage being displayed on the display operation device, and
      the dispensing instruction button being pressed.

3. The beverage dispensing apparatus according to claim 1, wherein the control device is configured to control the preparation and the dispensing of the beverage when a predetermined time has passed since the beverage reading device reads the information indicating the beverage and the information indicating the beverage is displayed on the display operation device.

4. The beverage dispensing apparatus according to claim 1, further comprising:
   a dispensing cancellation button for canceling the preparation and the dispensing of the beverage,
   wherein the control device is configured to perform control to cancel the preparation and the dispensing of the beverage when the information indicating the beverage is displayed on the display operation device and the dispensing cancellation button is subsequently pressed.

5. The beverage dispensing apparatus according to claim 1, further comprising:
a container detecting device configured to detect placement of the container into which the beverage is to be dispensed,
wherein the control device is configured to start the preparation and the dispensing of the beverage when the container detecting device detects the placement of the container.

6. The beverage dispensing apparatus according to claim 5, wherein, the control device is configured to stop the dispensing of the beverage when no container is detected by the container detecting device after the dispensing of the beverage is started.

7. The beverage dispensing apparatus according to claim 1, wherein
the beverage reading device is configured to read the information indicating the beverage from a receipt that is issued when the beverage is purchased.

8. The beverage dispensing apparatus according to claim 1, wherein
the beverage reading device is configured to read the information of the beverage while the container is being placed.

9. The beverage dispensing apparatus according to claim 1, further comprising:
an opening/closing door configured to open and close a space for the container to be placed therein, and
a door open/closed state detecting device configured to detect an open state or a closed state of the opening/closing door, wherein
the control device is configured to control to start the preparation and dispensing of the beverage upon detecting that the opening/closing door is in the closed state.

10. The beverage dispensing apparatus according to claim 9, wherein, upon detecting that the opening/closing door opens during the dispensing of the beverage, the control device is configured to stop the dispensing of the beverage.

11. The beverage dispensing apparatus according to claim 1, further comprising:
an opening/closing door configured to open and close a space for the container to be placed therein;
a door open/closed state detecting device configured to detect an open state or a closed state of the opening/closing door; and
a door opening/closing locking mechanism configured to lock the opening/closing door in the closed state, wherein
the control device is configured to unlock the opening/closing door responsive to the beverage reading device reading the information of the beverage, and
the control device is configured to lock the opening/closing door after the preparation of the beverage and the dispensing the prepared beverage are completed.

12. The beverage dispensing apparatus according to claim 1, wherein the display operation device displays guide information of the dispensing of the beverage.

13. A beverage dispensing method for preparing a beverage and dispensing the prepared beverage into a container, the beverage dispensing method comprising steps of:
reading information specifying a single beverage, the information including at least one of a shape, a material, a color of the entire container, a weight and a temperature, or any combination thereof, of the container, to thereby specify a kind and a volume of the single beverage that has been purchased;
displaying the information indicating the beverage for confirmation; and
preforming control to display the information indicating the beverage for confirmation and to subsequently prepare and dispense the beverage into the container.

* * * * *